United States Patent
Marcum

(10) Patent No.: US 10,320,966 B2
(45) Date of Patent: Jun. 11, 2019

(54) CELLULAR PHONE WITH KEYSTROKE ENTRY NULLIFICATION CONCURRENT WITH VEHICULAR MOTION

(71) Applicant: Alfred Marcum, LaGrange, KY (US)

(72) Inventor: Alfred Marcum, LaGrange, KY (US)

( * ) Notice: Subject to any disclaimer, the term of this patent is extended or adjusted under 35 U.S.C. 154(b) by 0 days.

(21) Appl. No.: 15/326,015

(22) PCT Filed: Jan. 20, 2015

(86) PCT No.: PCT/US2015/000012
§ 371 (c)(1),
(2) Date: Jan. 12, 2017

(87) PCT Pub. No.: WO2015/108706
PCT Pub. Date: Jul. 23, 2015

(65) Prior Publication Data
US 2017/0257479 A1    Sep. 7, 2017

(51) Int. Cl.
| | |
|---|---|
| *H04M 1/725* | (2006.01) |
| *H04W 4/02* | (2018.01) |
| *H04W 4/04* | (2009.01) |
| *H04B 1/3888* | (2015.01) |
| *H04M 1/02* | (2006.01) |
| *H04W 88/02* | (2009.01) |

(52) U.S. Cl.
CPC ...... *H04M 1/72569* (2013.01); *H04B 1/3888* (2013.01); *H04M 1/0266* (2013.01); *H04M 1/72577* (2013.01); *H04W 4/025* (2013.01); *H04W 4/027* (2013.01); *H04W 4/046* (2013.01); *H04M 2250/12* (2013.01); *H04M 2250/22* (2013.01); *H04W 88/02* (2013.01)

(58) Field of Classification Search
CPC ............ H04W 88/02; H04M 1/72577; H04M 2250/12; H04M 1/72569; H04M 2250/22
See application file for complete search history.

(56) References Cited

U.S. PATENT DOCUMENTS

| | | | |
|---|---|---|---|
| 2010/0234047 A1* | 9/2010 | Lipovski | H04M 1/72552 455/456.4 |
| 2010/0297929 A1* | 11/2010 | Harris | H04K 3/415 455/1 |
| 2013/0344859 A1* | 12/2013 | Abramson | G06Q 50/265 455/418 |
| 2014/0274023 A1* | 9/2014 | Rajeevalochana | H04W 48/04 455/418 |
| 2015/0148019 A1* | 5/2015 | Michaelis | H04M 1/72563 455/418 |
| 2016/0205238 A1* | 7/2016 | Abramson | G01C 21/3484 455/456.4 |

* cited by examiner

*Primary Examiner* — Jaime M Holliday
(74) *Attorney, Agent, or Firm* — Breneman & Georges

(57) ABSTRACT

A wireless communication device such as a cell phone with a screen with a portrait mode and a landscape mode and a motion sensor to disable the portrait mode while in a vehicle in motion to prevent texting and vehicle operation at the same time. The novel wireless communication device includes a continuous grasp and retention device along with an active control device and a passive control device to distinguish between a driver and passenger and prevent vehicle operator texting while allowing passenger texting while the vehicle is in motion.

20 Claims, 21 Drawing Sheets

PUB. US 2010/0297930 - Use of Sensory Strips on the Surface of a Phone to Determine User's Hands Placement PATENT 8,527,140 - Use of a Cell Phone's Onboard Accelerometer to Monitor Vehicular Vibrations Using vibration sensors to determine if vehicle is in engine on or off state

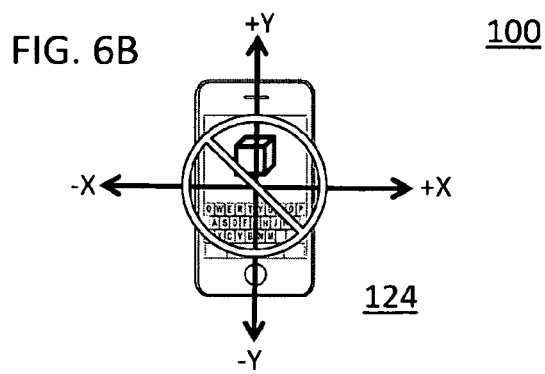
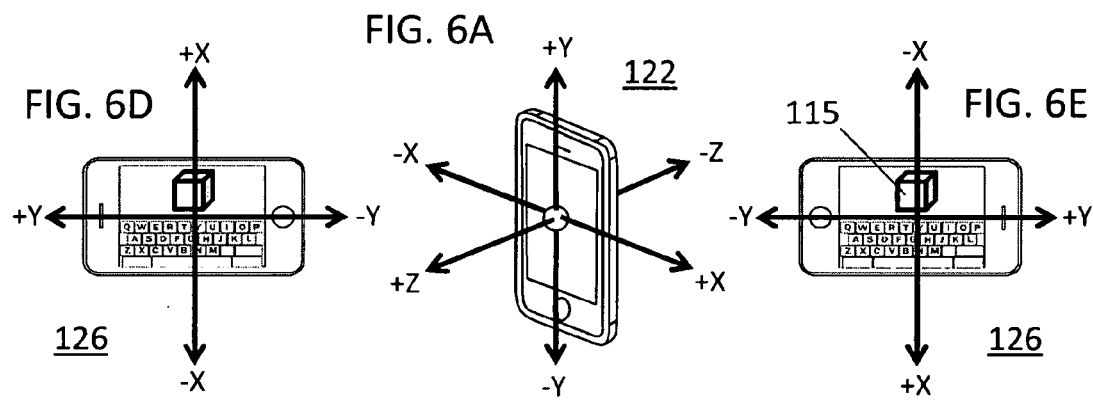
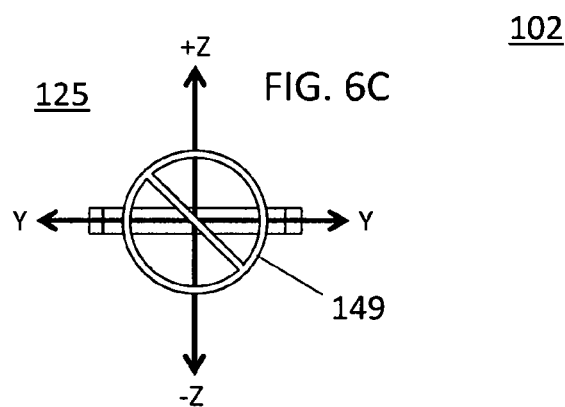

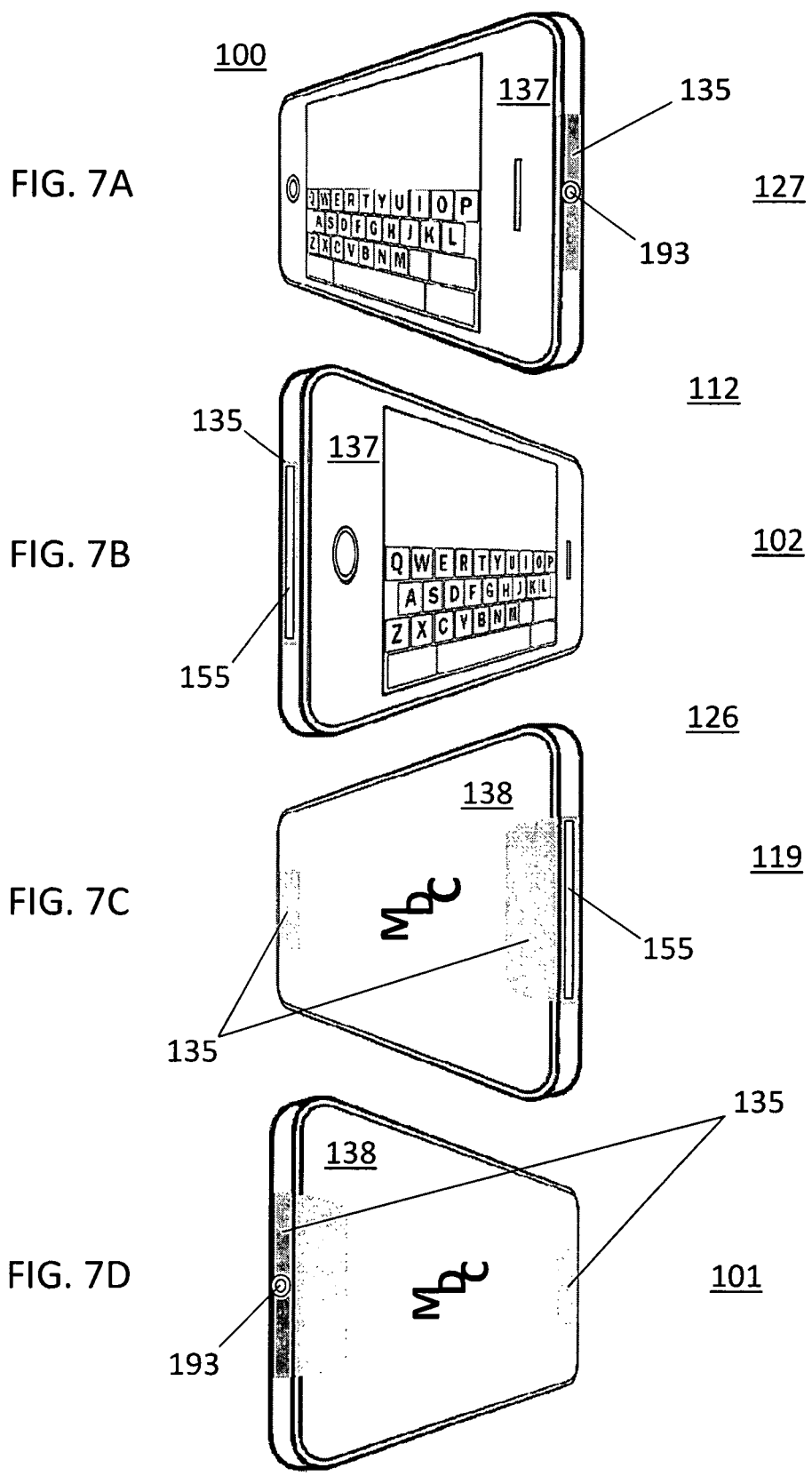

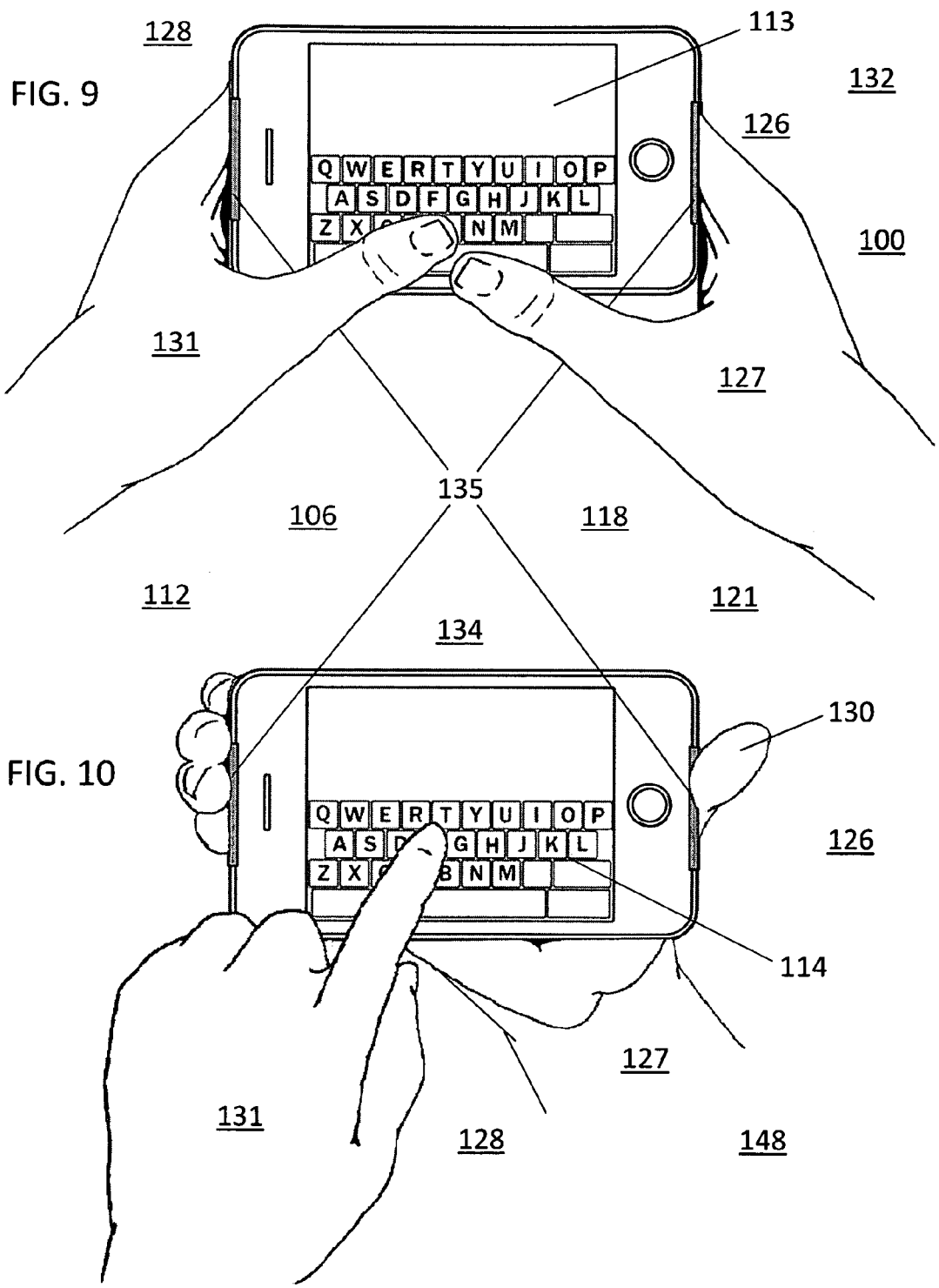

142

143

103

144

145

108

146

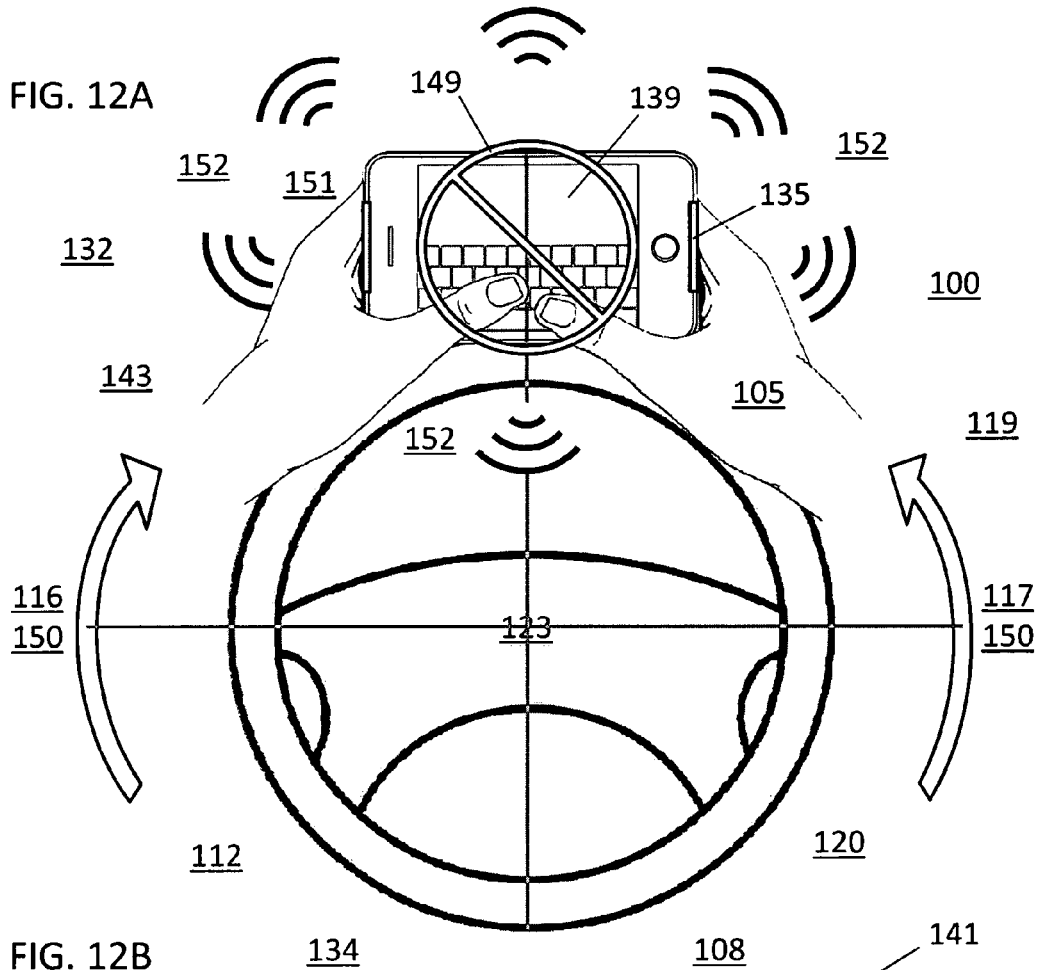

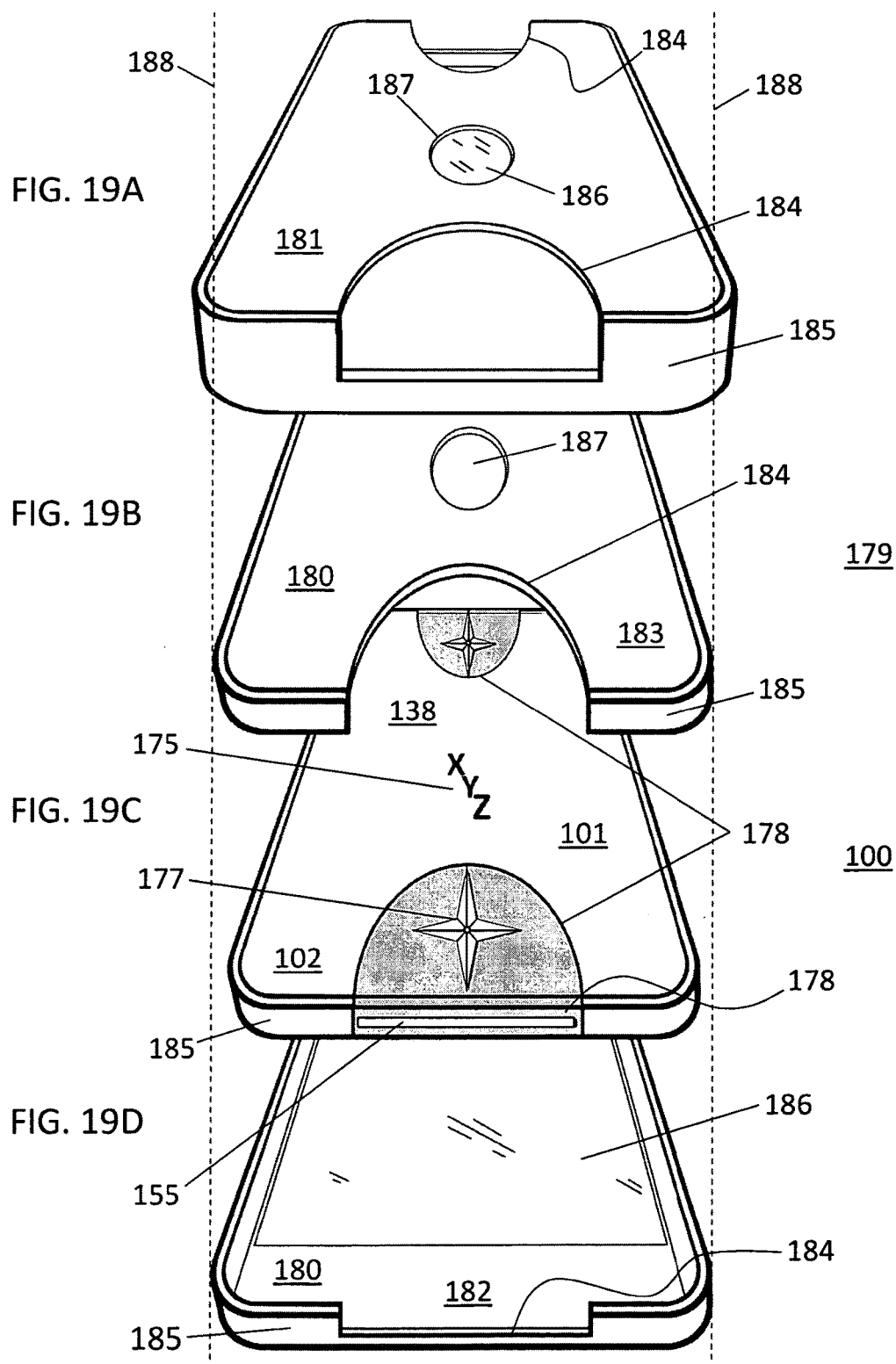

CELLULAR PHONE WITH KEYSTROKE ENTRY NULLIFICATION CONCURRENT WITH VEHICULAR MOTION

CROSS REFERENCE TO RELATED APPLICATIONS

This application is related to and entitled to priority based on U.S. Provisional Application No. 61/929,161 filed 20 Jan. 2014 and the disclosure materials therein including drawings and disclosure which bears the title Cellular Phone With Keystroke Entry Nullification Concurrent With Vehicular Motion.

BACKGROUND OF THE INVENTION

1. Field of the Invention

The present invention relates to wireless telecommunication devices that have the capability to send or receive "through the air" radio signaling respectively to and from other compatible wireless devices.

More particularly, it concerns novel "restricted use technology" that is integrally based and sourced from the platform of a cellular phone. The phone system has the unique capacity to distinguish between the driver and any passenger(s) occupying a vehicle in transit and thereby specifically preclude that driver from undertaking any phone activities that redirect their attention from the roadway and the safe operation of their vehicle.

Any phone so equipped with the blocking technology of this invention will provide the highway traveling public with protection from the dangers generated by a "driver" of any model or mode of vehicle whom is distracted by his or her own irresponsible and self-serving effort to view and utilize these wireless devices while the vehicular platform they are operating is detected as being "in motion" and traveling upon any roadway anywhere in the world.

These restrictive technologies are inclusive of, but not limited to, phone motion and orientation sensing that is applied in collaborative combination with a novel mandate for the phone user to maintain specific orientation and grasp requirements upon the phone. In particular, simultaneous body contact "must be maintained" upon and against designated contact areas situated upon and integral to a landscape oriented cellular phone in order to temporarily nullify the underlying "keystroke blocking capabilities" of the encoded "restricted use" programming.

The terms phone, cellular phone, wireless device, wireless phone, telecommunications device, personal digital assistant, radiophone, etc., are considered to be generally synonymous and thereby are used interchangeably throughout this specification.

The degree of danger represented by any driver that sits behind the steering wheel of a moving vehicle while attempting to text or otherwise execute keystrokes upon a wireless device, is extremely high.

These inattentive and often unlawful misuses of the ubiquitous numbers of cellular phones, and other wireless telecommunications devices that currently enjoy such a popular and ever increasing permeation within our global community, has become a major problem bearing tragic repercussions.

The danger manifests itself as the driver attempts to execute "attention diverting" keystrokes or finger swipes upon the virtual display of a wireless device in order to send text messages or to initiate any other mind/hand/sight coordinated type of touchpad data entry upon his phone while operating a vehicle that is in motion.

While being transported within that inappropriately operated vehicle, hazards are mutually incurred by the driver and passengers alike as well as for any of the journeying public encountered upon the roadway.

In order to limit these dangers, the present invention incorporates novel phone design modifications for grasping the wireless device and uniquely integrates them with specialized hardware and software applications within and upon the phone platform. These distinctive phone architecture arrangements provide for the automatic execution of "conditional use" blocking technologies that are selectively "manufacturer encoded" with instructions for placing display and keystroke entry restrictions upon designated programs of the phone when motion of the carrier vehicle has been verified through sensors.

The restrictive technology only applies to the specific programs/applications within the phone's menu that have been preselected and particularly chosen to be encoded with the blocking instructions. Correspondingly, the entire package of sensing and tracking technologies are only initiated and only become active upon a "restricted" program/application being opened. This precludes the wireless device from unnecessarily searching for a collaborative network signal for determining vehicular movement should a non-restricted program be opened thereby minimizing battery depletion.

Henceforward, it is requested to be understood that for the restrictive technology described for the present invention whereby the driver of a moving vehicle can be blocked from viewing and/or the physical entry of data upon opening and attempting to use a restricted program, that the terms keystroke, finger swipe, voice commands, or any other implementation method(s) such as a stylus, touchpad, trackball, mouse, joystick, etc., are included within the scope of the novel protection sought by this application.

These or other input techniques are to be considered as interchangeable terms without limitation for describing the interface methods available for human input upon the proposed wireless device. The acceptance or denial of these input methods will be directly managed by the device's pre-programmed and/or subsequently downloaded internal instructions. The prevailing directives are administered without user input or choice for the restriction of data entry, display navigation, or how they are to be used as "limiting" screen and/or program control tools.

It is also to be recognized that the present invention will be primarily described for use with wireless devices that have computer generated virtual displays and keyboards but also has iterations that are proficiently used to either allow or block human interface and input upon a non-virtual keyboard having "real" individual keys such as phones having a landscape oriented layout of physical keys. Phones possessing these types of physical keypads would still follow, conform, and operate similarly to those having computer generated keyboards and screens per the restrictive phone programming, physical adaptations, grasp requirements, and operational parameters exclusive to this invention that will be described and further defined in forthcoming detail.

2. Description of the Prior Art

Numerous prior art solutions employ motion tracking for the vehicle and/or the wireless device in combination with various methods for restricting data entry when it has been determined that the vehicle transporting the wireless device is in motion. However, none accomplish the desired blocking of imprudent keystroke entry through a unique combination of motion, orientation, and grasp detection capabilities that are mutually stationed and staged upon the physical platform of the wireless device itself, as does the present invention.

Newer wireless devices offer automated "speak and type" capabilities where spoken words are converted to written text and are a step up from the physical entry of text manually. However, these devices are still a very real and significant mental distraction since they must redirect the mental focus of the driver to compose and interpret each portion of the ongoing back and forth texting communication. The obscure danger belying such devices equipped with the capability for voice conversion and automated keyboard entry is that they may seem safe and thereby actually "encourage" texting and driving.

When you allow for the time required to review and correct transcription errors for these devices, voice entered text can be as lengthy a process as regular texting while still consuming a significant portion of the users' mental attention. An April, 2013 published study conducted by researchers at the Texas Transportation Institute at Texas A&M found "that sending text messages via voice while driving is just as dangerous as texting with fingers".

Spoken word to text conversion is an enabling technology versus the disabling technology employed by the current invention that blocks the phone user from having the option to continue an incorrect and dangerous behavior. Doing things that are possible are not always good reasons to do them. Just because voice to text conversion technology exists and makes "texting and driving" easier and more proficient, it is certainly not sufficient reason to encourage drivers to continue a self elected "distracted driver" activity or persuade others to begin.

Driving safety enthusiasts everywhere that work daily toward achieving increased driver alertness and overall roadway safety will certainly disagree with any technological premise that places extraneous demands upon the mental awareness of any driver, including the most vulnerable, inexperienced, and most likely age group to embrace and engage in such ongoing social discourse while driving, our youth.

Other technologies are available to phone users whom are fully aware and cognizant of the dangers of texting and driving and desire to pledge their compliance to not conduct any such imperiled activity. The "It Can Wait" campaign is approved by various phone manufacturers and/or service providers and promotes a restrictive application that can be downloaded that will reduce the temptation to text and drive by delaying reception of texts but still allows the user to elect to override the restrictive state. Although highly useful and of noble intent, this program does not provide a solution that prevents phone users that don't or won't recognize the inherent dangers of texting and driving from simply electing to turn off the prevailing restrictive state, such as a teenager of a parent pledged to the program might choose to do while driving independent of parental supervision.

U.S. Pat. No. 8,508,379, demonstrates a restrictive system that operates under a prevailing state of blocking activity that is activated upon positive identification of vehicle/phone motion. However, in that system the blocking activity can also be temporarily "turned off" upon the phone user successfully completing "visually and mentally involved" challenges or finger executed contact upon randomly displayed points appearing on opposing sides of an imaginary division line of the phone's virtual screen. Contact upon these random points appearing upon the screen is "momentary" in duration and switches off the blocking activity that permits unabated keystroke entry from that point with no further blocking conditions in force.

Comparing that to the present invention where execution of the temporary removal of the prevailing blocking activity is not a mentally or visually demanding task and is as simple as picking up the phone, retaining it, and using it. The phone is picked up in a landscape orientation and retained with a qualifying hand grasp that is executed upon "actual" permanently located contact areas that have fixed "intimately known" spacing upon the body of the phone itself. The hand or hands are then used to enter keystrokes while maintaining the previously established phone orientation and grasp conditions.

US Pub. No. 2010/0297930, employs sensory strips on the phone casing but does not couple and apply their use in conjunction with the disablement of some of the phone's orientations for viewing the virtual screen. In the present invention landscape orientation is in fact the sole orientation permitted for keystroke entry while the vehicle is in motion.

Schwartz, et al. (Schwartz) U.S. Pat. No. 8,527,140 concerns usage of a phone to sense vibration patterns indicating a vehicle with the engine running or not. However the sensory vibrations are net applied toward defeating all texting and driving which in general includes all passengers in the vehicle. While Schwartz does discuss a complicated data collection and processing to distinguish between a driver and passenger it would seem unreliable and impractable and it is not clear how such data collections and processing could be used since the vibration from running engine is used to deactivate the portable device.

In the subject invention, the contact areas are tangible phone based components integral to the phone casing and never exist as virtual objects displayed upon a screen.

Even more relevant is the fact that the human initiated contact is not a short term "momentary" interval of execution. Nor does it require any disruptive mental response to a "vision based task" or physical challenge which can be self-imposed distractions with negative "attention divertive" ramifications comparable to "texting and driving" itself.

A proper qualifying grasp is instead instinctively performed by retaining the phone in certain mandated orientations and ergonomic configurations that demand involvement of both hands of the phone user. The user then "elects" to maintain that qualifying grasp for as long as they desire to enter keystrokes on their phone while being transported within a moving vehicle.

A "continuous" application of human body contact has to be maintained in an enduring non-interrupted manner upon the "known" non-virtual contact areas to override the blocking activity. The permissive state for entering keystrokes upon the phone only lasts as long as that grasping task remains successfully executed and maintained.

That fact is extremely important since in the preceding exampled prior art, a passenger may successfully complete any questions, codes, or hand/finger manipulations to turn off the blocking activity and then pass the "keystroke enabled" phone to the driver. That scenario is not possible with the current invention due to "mandating" the maintenance of a continuous chain of qualifying orientation and hand grasp across the phone contacts. Should this chain of contact be broken as the phone is passed from the passenger to the driver, then keystroke entry will be instantly be blocked and require the two handed grasp to enable use of the phone upon it reaching the driver's hands. More importantly, even if a qualifying hand grasp were to be successfully transferred, the driver still would be unable to maintain it concurrent with steering the vehicle.

The maintenance or the breaking of these chain of grasp intervals may be explained, defined, and/or made better understood to the user through displayed information upon the phone's virtual screen that conveys the current status of the phone. The information may be in the form of screen messages, display of the keyboard in unique ways, or visual numeric time countdowns coupled with audible pulses that appear or are heard indicating a blocking activity is either being initiated or removed in reaction to and in parallel with elective actions that the user has respectively taken or may take toward the control and operation of his phone.

It is important to understand that these indicative methods and blocking states are all only realized should the phone be utilized within a vehicle that is sensed as being "in motion". The majority of the time, all of the restrictive technology and related indicative methods lie dormant in the background and will only come into play upon that user stepping into a vehicle and opening a restricted program of his phone and attempting to enter keystrokes and otherwise operate that phone while that vehicle has been put into motion at a speed falling within a predetermined and set range of rate of speed.

It is also highly pertinent and of particular importance that no other technology for restricting keystrokes upon a phone being used within a moving vehicle combines active and passive methods for controlling the application of the blocking technology as does the present invention.

Description for both methods will be elaborated upon in later detail however active control and prevention is congruent with a blocking command being issued due to an improper orientation or grasp of the phone. Passive control is only relevant to one particular texting configuration whereby the phone user is not able to text and drive due to the universal limitation of a human being having only two hands. In this texting position, passive control is not the issuance of a definitive black and white command for the initiation of a blocking action. Instead passive control means that the driver is forced to abandon his attempt to text and drive due to the fact he has no free hand available to steer the vehicle simultaneous with entering keystrokes while adhering to the demands of the current technology for holding the phone in this particular texting position. Conversely, any passengers traveling within the same vehicle can easily employ this identical texting position to enter text freely due to their not having the additional burden of having to steer the vehicle.

A number of other prior art systems utilize technology dependent upon basing some portion of their text restrictive system upon the vehicle and phone alike. This increased complexity and expense introduces higher reliability problems and suffers in comparison to the proposed restrictive technology being located exclusively upon the phone platform with absolutely no alteration or addition necessary to the vehicle itself. Not only does this avail use of the blocking technology for any make or model of vehicle but more broadly includes any type or model of transit platform where the operator utilizes a steering wheel, or some other method and variation of vehicular guidance structure, or steering motion other than pivoting about its own axis, to control the direction of the steerage.

It is common sense that a more practical and reliable method is needed for intervening the hazardous actions taken by a driver of a "moving" vehicle whom makes the conscious choice to split his focus between the vital job of observing the roadway to instead conduct the reckless physical or vocal entry of keystrokes upon a wireless device.

The more logical and effective approach is simply to "block" the driver's ability to text, e-mail, or navigate the internet while the vehicle is moving. Conducting any such personal messaging or research activity can and should be delayed until the first opportunity presents itself to stop the vehicle in order to initiate the desired wireless communicative action.

Additionally, and very importantly, none of the prior art technological systems proposed as solutions for the problem of distracted driving offers the simplicity, reliability, and low cost that the keystroke restrictive system of the present invention offers.

SUMMARY OF THE INVENTION

The relevant fact significant to the problem of texting and driving is the short spans of driver visual and mental attention that have to be diverted away from the primary driving task for the constant survey of the highway in order to safely steer the vehicle. The driver instead chooses to interrupt and fracture his or her roadway environmental awareness and interpretative ability by the rash and unwise decision to redirect intervals of their concentration upon the display of the phone's keypad for texting or other data entry. This misplaced focus in order to sequentially enter a series of keystrokes that compose words and thoughts formulated by the mind of a distracted driver is not without ill consequence. The unilateral risk taken by the driver is prevalent worldwide and endangers not only the driver but is equally forbidding and potentially deadly for all passengers and to the surrounding vehicular and/or pedestrian traffic.

It is thereby the full intention and entirely within the scope of the present invention to counter the very serious problem of distracted driving through the planning and equipping of a wireless device with "onboard" motion and orientation detection capabilities that operate in collaborative cooperation with novel orientation and human touch and grasp requirements upon the phone itself. This unique offering of motion and orientation sensing combined with novel phone design and handling requirements collectively function to serve as a highly effective deterrent to the inappropriate and dangerous use of a wireless device by the driver/operator of a "moving" vehicle.

These grasp and retention of the phone requirements must be executed by the hands of the phone user directly upon the phone casing in order for the predetermined restrictive programming to "not" be initiated and prevail. If the driver fails to collectively satisfy the phone orientation and grasp requirements while the vehicular medium is in transit then the preprogrammed conditional use restrictive instructions for the phone will dominate and preclude the driver from the capability to enter keystrokes or finger swipes for specified phone feature(s) and/or program(s), such as text messaging.

It is likewise a vital contingent of the phone restriction system of the present invention to "not" preclude or prevent any passengers that are mutually traveling within that same moving vehicle, that also own or possess phones equipped and programmed with the same "restrictive use technology", from having the capacity to access and effectively use the full range of their phone's capabilities and features.

A very important fact about the technological plan for this invention versus conventional plans is that all of the blocking procedures and methods employed are proactive in nature versus being reactive by waiting for irregular patterns or segments of texting to occur and be analyzed before a determination is made to apply the restrictive state.

A select and comprehensive plan for encoding the phone with the restrictive blocking technology would generally occur during the manufacture of the phone or may otherwise be subsequently downloaded at the time of purchase during activation of the phone.

Should any individual customization of the phone be required to address the particular concerns or needs of the consumer, those specific alterations would also best be accommodated during the "new phone" purchase and activation procedure. However, in general, the restrictive programming plan for the cellular phone is meant to be standardized, unalterable, and without choice by the phone user upon what phone activities are to be restricted.

A continued quest seeking a carefully scrutinized plan that would determine and clarify the scope and the type of phone use behaviors that should be permitted by a driver while operating a moving vehicle would provide a nationwide safety blueprint and guideline for actions to be taken and laws to be introduced for improving public highway safety. Such a plan should be garnered and pieced together from detailed discussion and discourse between experienced roadway safety officials and experts in order to arrive at a consensus opinion upon what construes dangerous phone use and what activities should be blocked from driver availability while operating any moving vehicular platform.

What makes texting such a particularly dangerous and potentially deadly act to attempt while driving is the extraordinary fine focus that has to be drawn away from a normal level of driver attention and observance. In order to perform such precise strikes of the fingers upon such small keypad targets with any degree of accuracy requires complex actions to be undertaken by the hands along with placing high supporting demands upon the mental faculties of the driver that collectively, all become way too detailed to execute while driving. To attempt to alternate back and forth between the broad focus of roadway observance and the pinpoint focus of keypad strikes is a nonsensical endeavor since the tendency to linger and dwell upon the display of the phone is entirely too lengthy. With repeated episodes of those extended snippets of time being removed from the proper survey of the roadway, the likelihood of an accident occurring is not only probable but borders upon certainty.

According to manufacturers, insurers, and repair shops the most common cause of cell phone breakage is the user tripping while texting. If a person cannot avoid objects in their path while walking and typing text, how can they possibly expect anything other than disaster from their attempt to successfully conduct the much more complex task of negotiating the roadway while driving and texting?

It is a totally improper and dangerous behavior for the driver to elect to interrupt his own vehicular operative awareness with a superfluous activity that detracts from his or her limited capabilities for maintaining long term consistent roadway observation. These self imposed distractions that clutter and severely impede the ability to coordinate the executive activities of any human beings' cognitive/mind, manual/hand, and visual/sight faculties, is simply not acceptable. That choice needs to be removed in order to provide a safer roadway environment for everyone including those that choose to not protect themselves, namely any driver that elects to continue to "text and drive".

BRIEF DESCRIPTION OF THE DRAWINGS

FIGS. 6A-E concern different phone orientations relative to the user's perspective. In 6A a three-dimensional representation is made for a rectangular phone that is oriented vertically in a portrait mode that is consistent with an industry accepted orientation for a cellular phone layout with the phone's earphone at the top and the speaker at the bottom. More importantly, in 6B and 6C illustration is made for the disablement of portrait and tabletop orientations as user options when the phone and the carrier vehicle are in motion. This leaves the images of the two 180 degree flipped landscape orientations shown in 6D and 6E as the only allowed orientations where keystroke input is permitted and is primary to the blocking system of this invention. The content for their respective virtual screens show matching orientations of their displayed graphic materials and virtual keypads that always result in images that are in optimal viewing positions relative to the eyes of the phone user.

FIGS. 7A-D illustrate further significant portions of the plan of the present invention through representations made for the new requirement that now mandates a "landscape oriented" phone use position. Very importantly, illustration is made for physical additions that are to be included upon a wireless phone that are highly novel aspects of this invention for preventing texting while driving. The illustrations show hand sensing "contact areas" that are included and generally situated at the right and left ends of a phone having its front and backsides displayed while oriented in landscape mode. These contact areas generally cover some portion of the ends and the front and backsides of the phone. 7A and 7B depict a perspective view of the contact areas from the front "virtual display" side of the landscape oriented phone while 7C and 7D depict the phone's backside perspective view of those same "integrally" attached contact areas.

FIGS. 9 and 10 illustrates the newly mandated "landscape phone use position" that calls for the exclusive use of a landscape oriented phone. Both of these phone depictions possess the novel dual contact areas employed as tools to verify the unique hand(s) placement positions across and/or simultaneously against both contact areas. Fulfillment of these hand placement requirements are mandated as phone use "compliance elements" to be executed by the phone user while the vehicle is sensed as being in motion. Maintaining proper "qualified" hand contact upon the phone is now a required action by the phone user in order to successfully enter keystrokes. More particularly, FIG. 9 shows the two hands of the user individually grasping and touching a contact area at either end of phone while using the thumbs to nimbly enter keystrokes. FIG. 10 illustrates one hand bridging across both of those same contact areas located upon opposing ends of the landscape oriented phone while necessitating use of a finger from the remaining hand as a stylus for the accurate entry of keystrokes. The mandated hand positions upon the landscape oriented phone in FIGS. 9 and 10 mimic and parallel the user preferred "comfortable and adept" keystroke entry positions previously depicted respectively in FIGS. 5A and 5B. These illustrations of "qualifying" hand contact and phone orientation positions dictate that "solely" the passenger, and not the driver, has the capability to execute them simultaneous with the entry of keystrokes thereby preventing "texting and driving".

FIG. 11 shows a portrait oriented phone where one hand is used to both hold the phone and enter text while the remaining hand is used to steer the vehicle.

FIG. 12 shows a landscape oriented phone with a hand placed at either end to retain the phone while the thumbs are used to enter text. This unitized phone/hands assembly is then placed on the steering wheel in order to enter keystrokes while guiding the vehicle.

FIG. 13 shows a phone oriented in tabletop mode as being balanced upon the thigh of the driver's leg. One hand is used to tap in text while the remaining hand is devoted to steering.

FIG. 14 shows a landscape oriented phone being retained with one hand concurrent with the thumb entry of text while the remaining hand grasps the steering wheel. This method for texting and driving is similar to FIG. 11 but is highly non-ergonomic.

FIG. 15 shows a landscape oriented phone being held by the user with a hand at each of the phone's ends. In this configuration the user alternates between texting and driving by entering text over a brief interval and then removing one hand from the phone and placing it on the steering wheel. The driver then surveys the roadway and guides the vehicle before returning his hand and focus back to the phone for more text entry.

FIGS. 19A-D further illustrate the alignment of the phone shown in 19C with the protective housing components depicted in 19B and 19D thereby forming an inner case surrounding the phone. This subassembly undergoes final insertion and encasement within the outer enclosure shown in 19A thereby forming a protective housing assembly around the wireless device that has mutually aligned cutout areas that provide open direct hand access to the underlying contact areas integral to the phone.

DETAILED DESCRIPTION OF THE DRAWINGS

Figure 1:
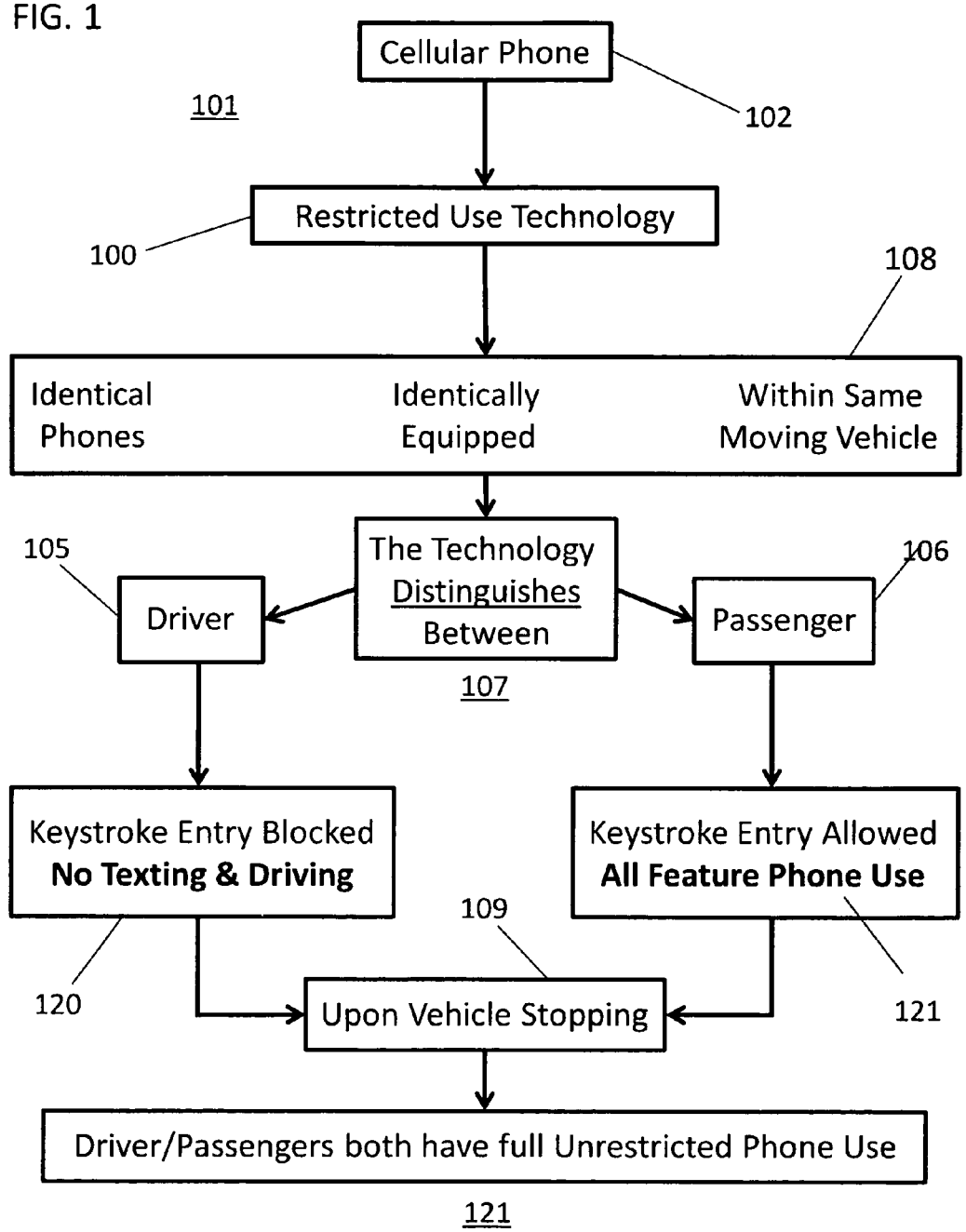
FIG. 1 illustrates the prevention of "texting and driving" by a simple phone sourced technology that distinguishes between the driver and passenger and blocks that driver from keystroke entry while the vehicle he or she is operating is determined to be in motion thereby averting a distracted driver from being on the roadway.

Viewing FIG. 1, it is the design goal of the present invention to offer a technological plan for restricting the use of specified programs contained upon a Wireless Device 101, in particular a Cellular Phone 102, while traveling within a Vehicle 104 in transit. Restricted Use Technology 100 is included that is centrally contained and implemented from the physical platform of the cellular phone and, through a profoundly simple method, is able to Differentiate 107 between the two phone user groups, a Driver 105 and a Passenger 106. It is the further intent of the technology to "disrupt and prevent" the highly problematic action taken by a distracted driver to formulate, send, or receive and read text while operating a Vehicle in Motion 108. This life endangering activity of Texting and Driving 103 occurs daily upon roadways everywhere worldwide.

The overall plan is to block any driver with a phone so equipped with the restrictive technology of this invention from having the capacity to "text and drive" yet still allow all passengers within that same "moving" vehicle that possess similarly equipped phones, full access to their total gamut of phone features and applications.

Keystroke entry restrictions are only initiated and blocking actions only applied upon the phones of users that are "unable", as in the case of the driver, to conform to certain mandated orientations and physical actions to be executed upon their phone subsequent to onboard sensing "positively" ascertaining that the "carrier" vehicle is moving. The automatic blocking action is only activated concurrent with any restricted phone programs being open and in use that have been selectively programmed by the manufacturer to be under restriction while the vehicle/phone are in motion in accordance with the restrictive technology of this invention.

Upon the Vehicle Stopping 109, all of those like equipped phone(s) revert to their previous "fully unaltered manufactured state" before the restrictive technology of this invention was initiated and applied.

Figure 2:
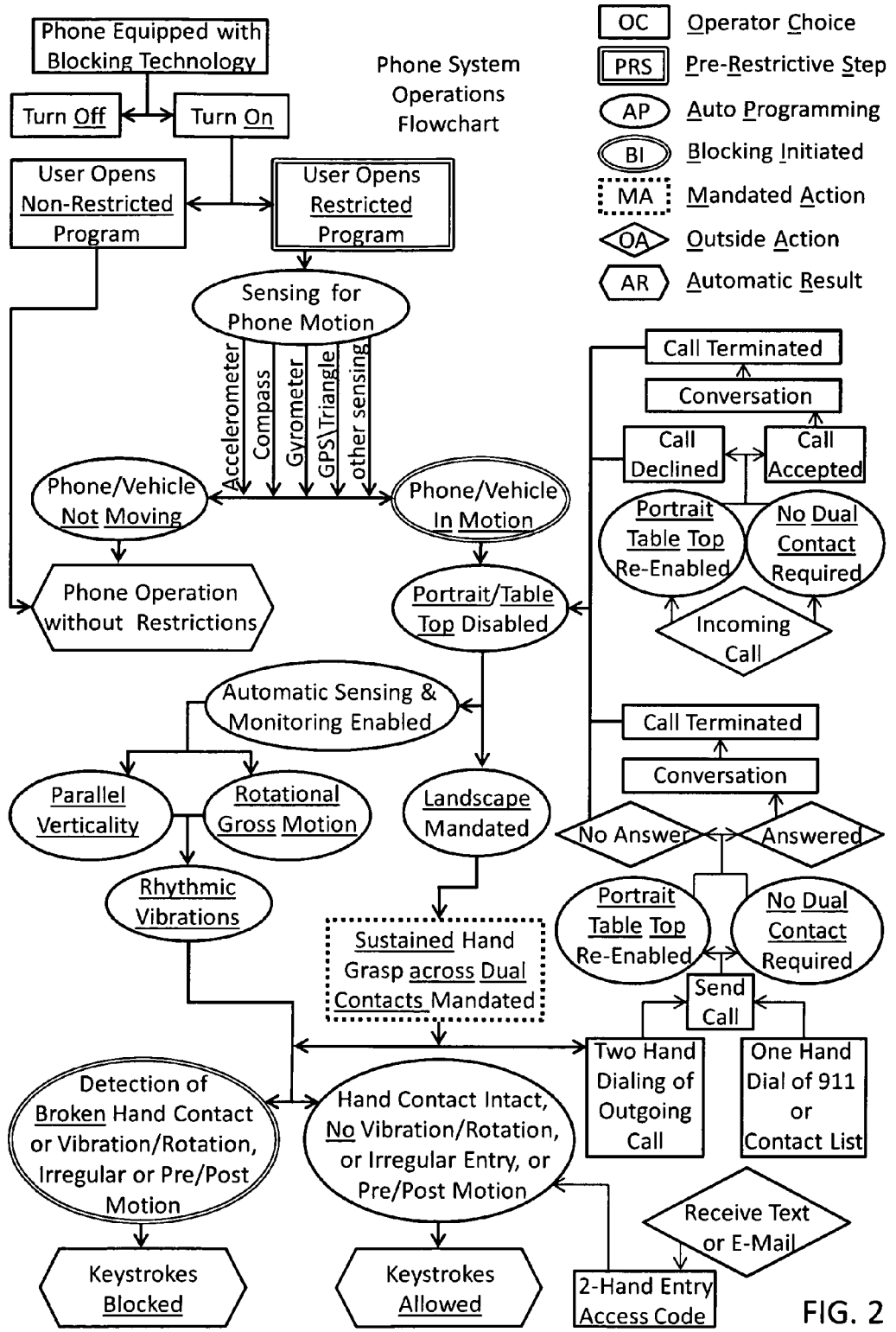
FIG. 2 is an operational diagram and logic flowchart for the preferred embodiment of the present invention.

Examining FIG. 2, representation is made for a logic flowchart and operational diagram that in general illustrates a step by step plan for the blocking technology of this invention and devices utilized to prevent texting while driving. These devices are connected to each other to distinguish between a driver and a passenger and provide a two step disablement of the driver's communication device and comprise:
  (a) a case or housing having a screen with a portrait display keypad and a landscape display keypad and a communications device disposed inside the case or housing;
  (b) a motion sensor coupled to the communications device to disable the portrait display keypad at a predetermined rate of motion;
  (c) a continuous grasp and retention device disposed on the case or housing to require a continuous grasp and retention by at least one finger of each hand or one portion of a hand and a finger position to allow an input of data on the screen; and
  (d) a rhythmic vibration or rotary motion device to disable the input of data on the landscape display on the screen.

The design for the preferred embodiment and best mode of the wireless phone restrictive system of the present invention for the prevention of "texting and driving" is to include a single or a hybrid array of motion and orientation detection systems. The detection systems will primarily employ a multi-axis Accelerometer(s) integrated with or employing magnetometer, gyroscopic, compass based and/or other motion sensing/tracking technologies which are all to be generally phone based, equipped, powered and sourced. Motion detection and tracking are additionally supported or independently backed by other position/motion sensing technologies, such as GPS (Global Positioning System) tracking and/or positioning determined through signal triangulation of the cellular transmission system itself.

However, it is requested to be understood that the just referenced preferred "phone based/sourced" improvements does not prohibit nor preclude that a portion of those detection and/or orientation features or systems could be based or sourced as standalone accessories or aids that are to be carried upon the person using the wireless device or that either type of sourcing could interface with and be supported by outside based cooperative technology stationed independent of or upon/within whatever transport vehicle, platform, or medium that the wireless device(s) would currently occupy. This alternate basing of some portion of the sensing and orientation technology would not prevent its collaborative use and interface with the unique physical design, orientation, motion detection, and grasp requirements mandated for the phone itself that are exclusive to this invention and are fully described hereinafter.

Further description of the elements and methods illustrated in this flowchart will be elaborated upon forthcoming in this specification.

Figure 3A:
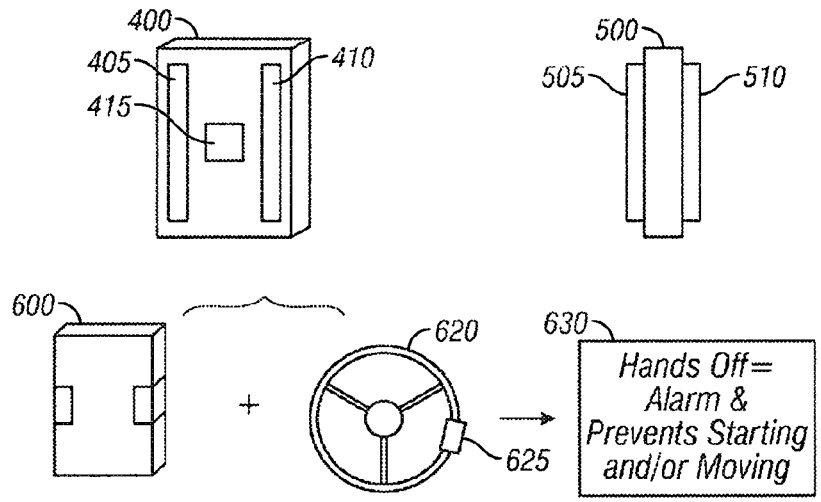
FIGS. 3A and 3B are depictions of relevant Prior Art. 3A shows hand contact strips on the phone. 3B portrays a flow chart for detecting vehicular vibrations from a phone.
Figure 3B:
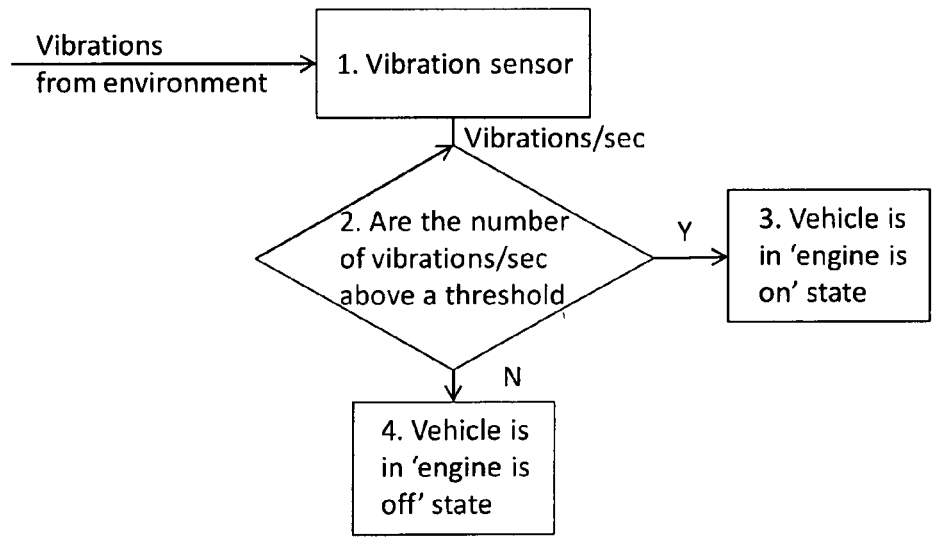

Viewing Prior Art FIGS. 3A and 3B, differences between the present device and prior art is illustrated. FIG. 3A relates to a restrictive system employing touch strips upon the casing of a phone of Pub. US 2010/0297930. This example, along with other designs that deploy points of hand contact upon the surface of a mobile device, all similarly use the touch contacts to help determine user hand positioning. However, none of the prior art employs use of contact areas secondary to disabling portrait and tabletop (laptop) modes thereby relegating the phone user to the exclusive use of landscape mode for keystroke input while the carrier vehicle is in transit. No description or claims are made for broad contact areas, not strips, which are deployed on the device surface on the short ends of the rectangular device in locations specific to user hand contact on a landscape oriented phone. None provide continuous coverage over multiple surfaces of the landscape oriented device, and in particular, involve and make critical detection use of the line angle(s) where multiple surfaces of the phone join one another. Pub. U.S. 2010/0297930 specifies touch strip usage in 2 hands mode only thereby leaving no provision for a phone user to hold the phone with one hand while entering keystrokes with the other. Tapping in keystrokes with a finger of the free hand is a necessity for a great number of phone users with thumbs too big to utilize a two handed grasping mode. Interrelated to allowing a single hand grasp of the phone, there is no disclosure of Active and Passive devices that differentiate between a driver and a passenger that are a direct result of utilizing contact areas upon the phone in conjunction with allowance of both a double and a single hand phone grasp. Neither does Pub. U.S. 2010/0297930 discuss or disclose how sensory strips on the phone surface may be usable in conjunction with an outer shell or housing that protectively encloses the phone. Most users desire and acquire an outer cover to provide protection for their investment and the valued content of their phone.

FIG. 3B illustrates a system of detection in Schwartz U.S. Pat. No. 8,527,140 that identifies vehicular vibrations through use of the phones onboard hardware and software capabilities. Although the end use of this system does pertain to the defeat of texting and driving, its function for determining the on/off status of the engine of a vehicle is applicable to completely disable the use of phones in a vehicle as it does not distinguish a driver and passenger without relying on kinematic forces or data collected over time to compare with known roads and locations.

Now Viewing FIGS. 4A, 4B and 5A, 5B, in general the physical shape of an ever increasing number of modern cell phones and their accompanying screens outline a large "rectangular shaped" casing accompanied by a computer generated "virtual" display.

If the Wireless Device 101 is retained in a manner where the two shorter sides of the rectangular phone are positioned as the non-respective top and bottom ends as viewed by the user, then the screen of the Cellular Phone 102 is described as being displayed in the taller Portrait 111 orientation or mode as depicted in 4A and 4B.

If the phone is held in a manner where the two shorter sides of the rectangular phone are positioned as the non-respective right and left ends of the display as viewed by the user, then the screen of the phone is described as being displayed in the wider side to side Landscape 112 orientation or mode as depicted in 5A and 5B.

Located within more sophisticated phones, such as a Smartphone, tilt sensing and orientation technology is in place that automatically shifts or pivots the text and images displayed upon the phone's computer generated Virtual Screen 113 in reaction to any "real time" shift of the physical orientation of the phone itself. Relative to a specified increment of phone rotation and repositioning, the alphanumeric and graphic content of the generally rectangular display screen has its orientation altered in concert with retaining a consistent and advantageous viewing angle relative to the user's perspective.

This coordinated change in the display and alignment of the graphic contents of the virtual screen is independent and opposite to any physical rotation of the device itself and is generally accomplished through variable tilt and orientation sensing by an onboard accelerometer(s). Discussion of accelerometer use and function is highly relevant to this invention since it plays a vital role in determination of vehicular motion as well as being essential in defeat of certain texting positions that concern vibration sensing around the steering wheel.

Figure 4A:
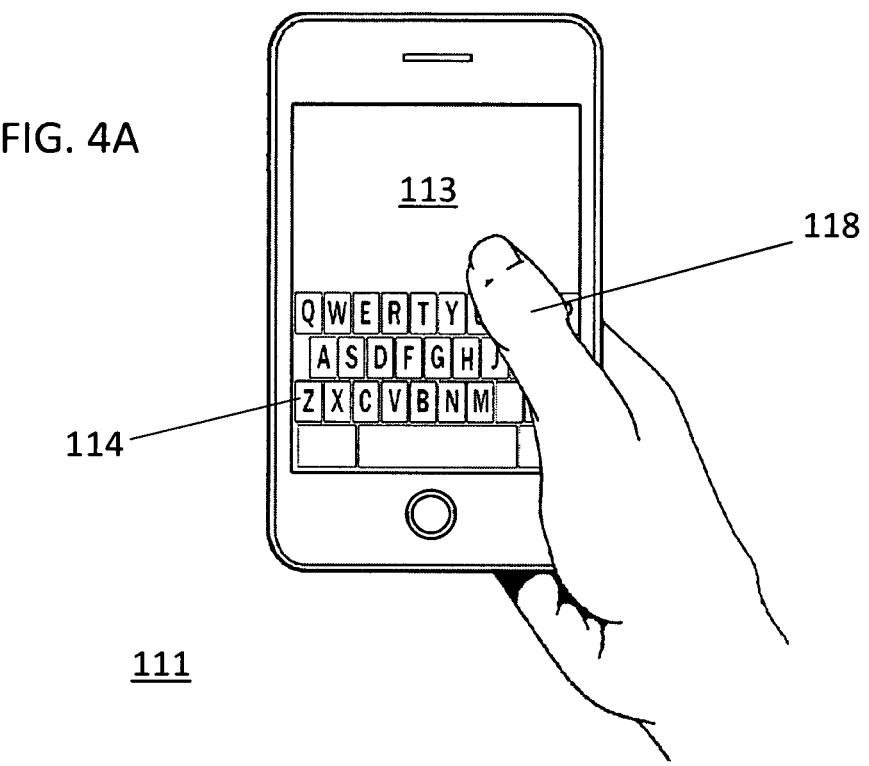
FIG. 4 shows two "user preferred" hand(s) upon the phone positions in 4A and 4B for the comfortable and adept entry of keystrokes upon a phone oriented in "portrait mode".
Figure 4B:
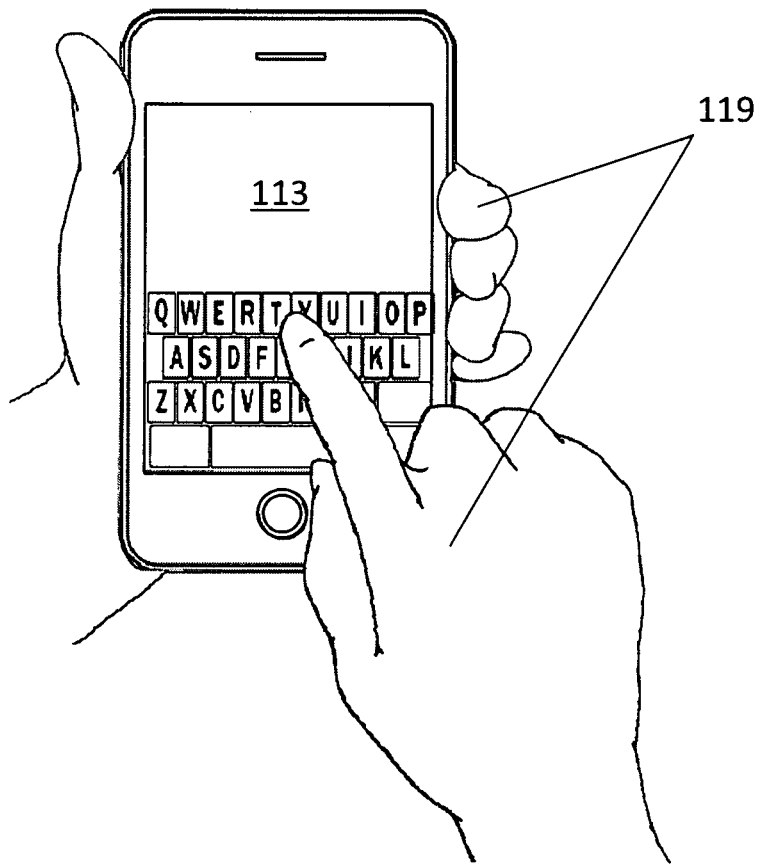

Viewing FIG. 4A, for "one-handed" viewing or for scrolling and typing of text, the taller Portrait 111 view is often chosen for keystroke entry in one of two preferred hand configurations and techniques as illustrated in 4A and 4B.

FIG. 4A depicts the ability to employ the thumb to enter keystrokes upon a portrait oriented phone and conduct Single Handed 118 entry of text. 4B depicts an alternative keystroke entry position used by persons with larger or less nimble thumbs. One of the smaller fingers, normally the index finger, is used to adeptly tap in individual keystrokes in this particular configuration for Two Handed 119 text entry upon a portrait oriented phone.

The portrait oriented position of 4A happens to coincide with the primary hand/phone configuration that most drivers employ during the commission of the dangerous "distracted driver" action of Texting and Driving 103 that is targeted for restriction and prevention by this invention. With that fact in mind, the phone user's capability for enacting either single or two handed operation of a portrait oriented phone as respectively shown in 4A and 4B, as well as all other portrait oriented phone use in general, will be dealt with in definitive fashion in upcoming detail.

Figure 5A:
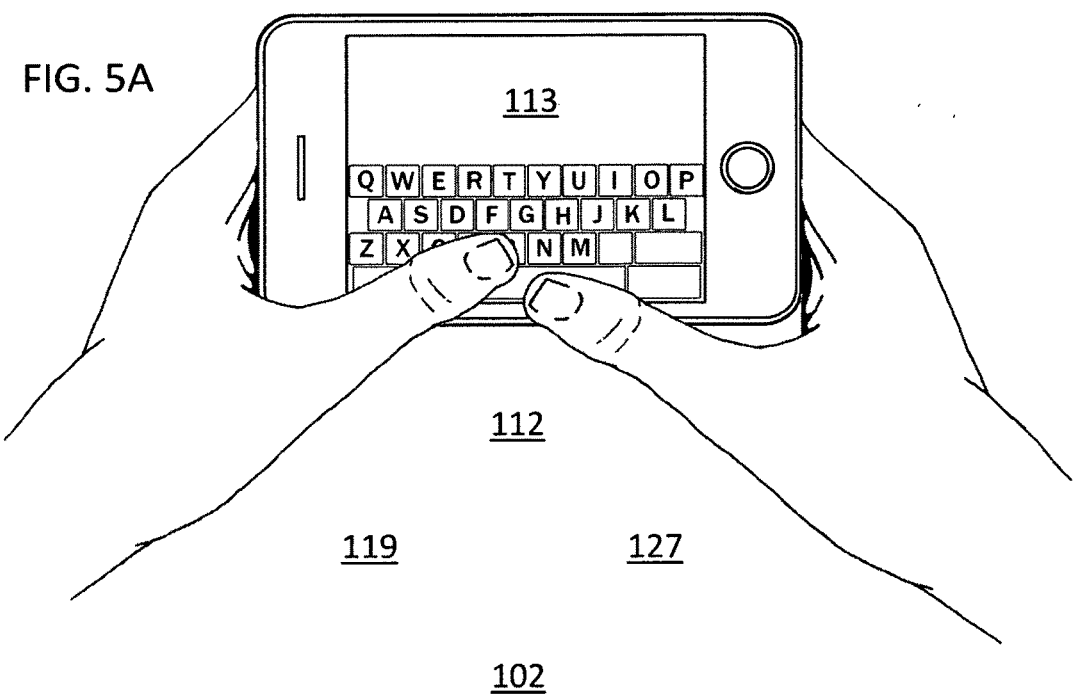
FIG. 5 shows two "user preferred" hands upon the phone positions in 5A and 5B for the comfortable and adept entry of keystrokes upon a phone oriented in "landscape mode". These depictions illustrate landscape oriented phone usage previous to the phone restrictive elements in accordance with the present invention being respectively added in FIGS. 9 and 10.
Figure 5B:
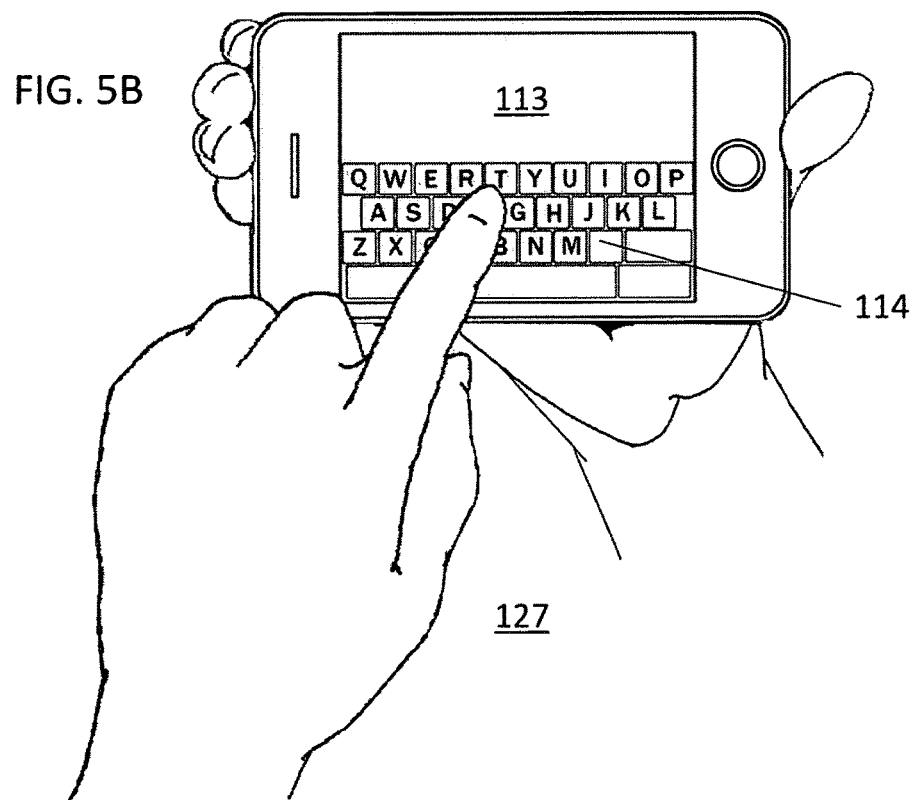
Figure 8A:
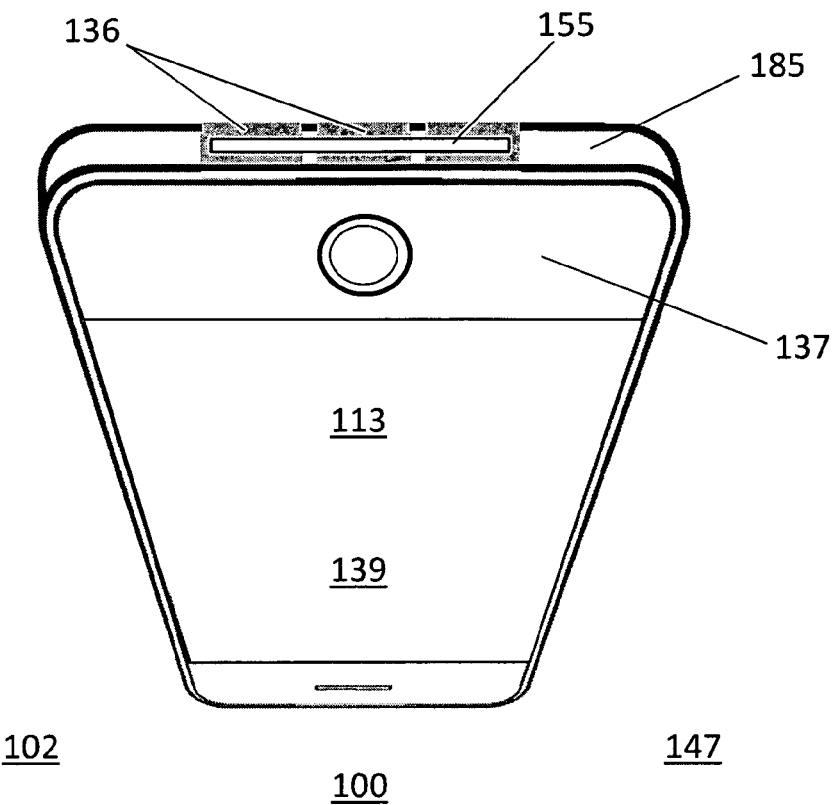
FIGS. 8A and 8B illustrate vertical "portrait oriented" perspectives of the same unique tandem of "hand contact" areas upon the phone. The contacts are shown in the general areas of the top and bottom of a phone whose front and backsides are respectively displayed. The contacts in 8A and 8B differ from those depicted in 7A and 7B in that the contacts are split into multiple separate portions for providing advanced sensory means to determine various finger and hand positions of the user relative to the phone. The multiplicity of contacts can determine whether two separate hands are being utilized to retain the device or one hand is bridging across the back of the phone thereby contacting both of its ends and their respective contact areas. The multiple contact areas can be used as triggering means for blocking keystroke input for certain phone functions if two hands do not remain on the phone at all times. You will notice that the virtual screen representation made in 8A is blank without display of any graphic content or alphanumeric keys. The missing virtual keyboard is representative of the fact that the portrait orientation for phone use is no longer permissible as depicted earlier in 6B thereby denying any keystroke entry. The blank screen is one of several methods to be offered by this invention to indicate a prevailing status of "keystroke entry denial".
Figure 8B:
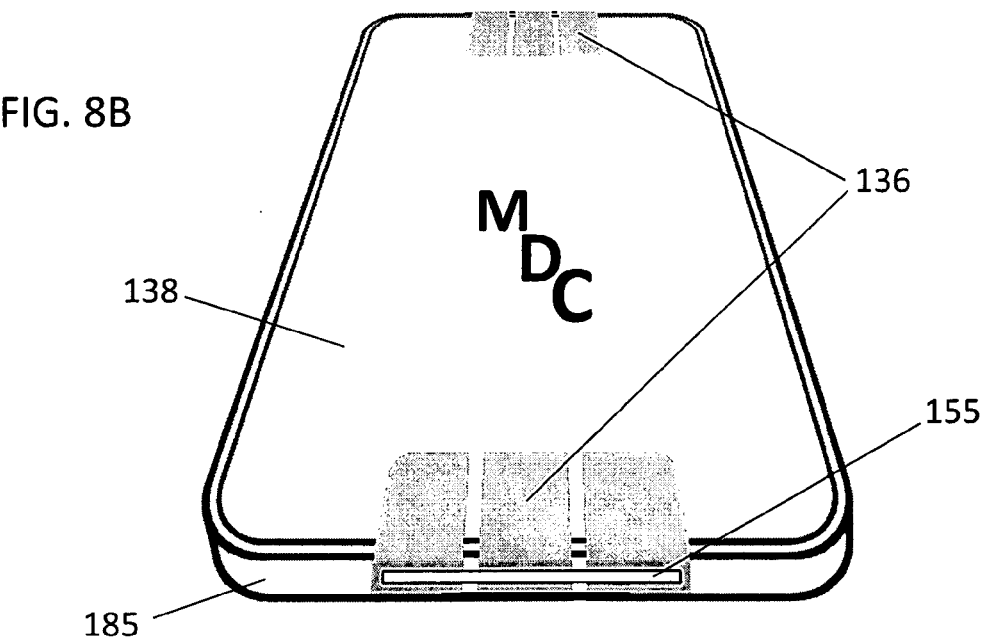

Looking at FIGS. 5A and 5B, in order to view more panoramic perspectives of pictures or to type upon a less crowded alphabetic keyboard, the wider Landscape 112 orientation is the proper choice. In general, the wider the virtual keyboard the better the spacing between the individual keys thereby resulting in fewer cross-key errors during keystroke entry. FIGS. 5A and 5B depict a couple of ergonomic Two Handed 119 configurations for the positioning of the hands upon a landscape phone popularly utilized by many phone users for entering keystrokes.

The relevance of the user currently having a choice between the phone orientations that he or she prefers for viewing the virtual display of the phone is a "highly essential factor and a key component" of the keystroke blocking technology of the present invention. Those orientation choices are also inclusive of tabletop (laptop) mode as well. In fact, the choice between portrait, tabletop, and landscape orientations is significant to the extent that two of the orientations are totally disabled from usage while the other is exclusively used in conjunction with the execution, or the lack thereof, of other novel collaborative "phone user" actions performed upon their phone that collectively will either "allow" Permit Texting 121 or "restrict" Block Texting 120 keystrokes and/or other forms and methods for data entry.

Viewing FIGS. 6A-6E, a six dimensional perspective is shown in 6A showing the X, Y, and Z axis of a rectangular cell phone.

Two of those axles, the Y and the Z axis are to be disallowed as orientations for the user to be able to retain the phone and input text while the vehicle is in motion. 6B represents the long axis of a vertical phone whose orientation is considered as being in Portrait mode. Portrait Disablement 124 for the Y Axis along with Tabletop Disablement 125 for the Z Axis are respectively illustrated in 6B and 6C and are key elements in the blocking scheme of the present invention. It should be recognized that from this point forward that any mention of disallowed orientations is inclusive of both portrait and tabletop modes. This leaves the landscape orientation, the X axis represented in 6D and 6E, as the mandated and sole orientation for all phone use while the carrier vehicle is in transit.

Figure 13:
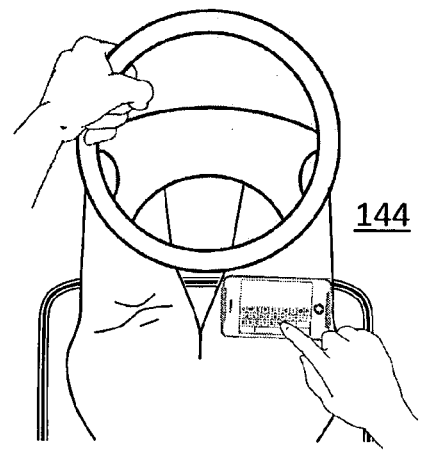
Figure 14:
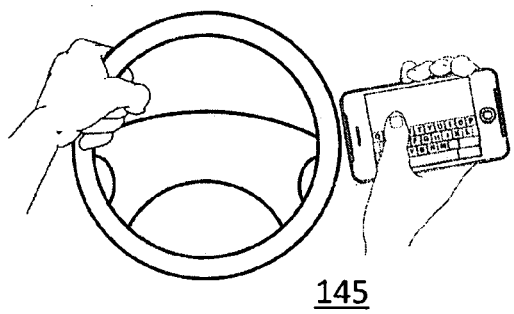
Figure 15:
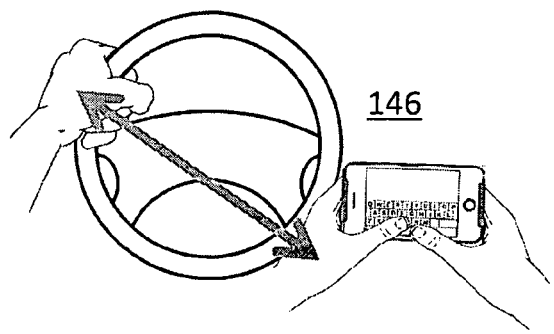

Viewing FIGS. 11-15, illustration is made for five different texting while driving configurations of how the drivers' hands are employed in relation to the steering wheel and the phone itself. Although there are other minor derivatives of each position, these overall represent and encompass the problematic state of Texting and Driving. FIGS. 11-14 are similar in that the user retains at least one hand on the steering wheel at all times. FIG. 15 is more dangerous as the driver alternates between steering with one hand and then elects to remove that hand from the steering wheel back to the phone to execute brief intervals of text input.

Figure 11:
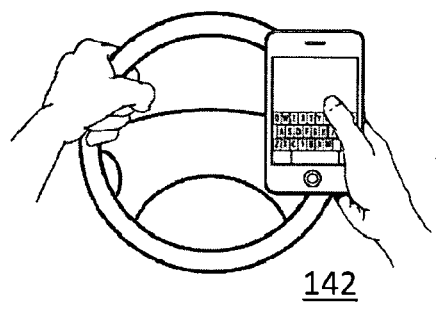
FIGS. 11-15 represent five different body/hands/phone positions that a driver might employ to enter keystrokes in order to compose and send text messages while behind the wheel of a vehicle in transit.

Looking at FIG. 11, a typical "texting while driving" hand/phone configuration for the entry of keystrokes upon a Portrait 111 oriented phone is shown in FIG. 11. This Single Handed Texting 118 position mimics one of the preferred portrait oriented phone text entry positions illustrated earlier in 4A.

The driver generally employs one hand upon the steering wheel to guide the vehicle while devoting the remaining hand to retaining the phone. Concurrent with that one handed grasp of the phone, the thumb is used to implement the instructions issued by the brain for execution of the finely detailed motor skills required in order to enter precise finger strokes upon the relatively small individual keys of the wireless device. Mental instructions that are entirely too complex to process and way too exact to carry out in tandem with safely navigating a vehicle upon the roadway.

A Portrait 111 orientation for the phone is "demanded" for this method of driving and texting due to one hand being dedicated to steering the vehicle while the remaining hand is tasked with the "dual requirements" to both grasp the phone simultaneous with the agile entry of keystrokes by the thumb.

Defeating use of this texting configuration by excluding portrait oriented usage of the phone while the vehicle is in motion is one of the key facets of this invention. The "highly used" texting position depicted in FIG. 11 is simply eliminated by the programming restriction of not permitting portrait oriented phone use.

While traveling within a "moving" vehicle, a new requirement is made to specifically disable and Exclude Portrait Mode 124 as well as Tabletop Mode 125 for all phone use while Mandating Landscape Mode 126 as their exclusive replacement. By implementing these new restrictive conditions, the single hand phone use position depicted in FIG. 11A would be completely eliminated, and more importantly any one-handed phone execution for texting and driving in landscape orientation such as that represented in FIG. 14, would be highly awkward to physically implement.

Figure 14A:
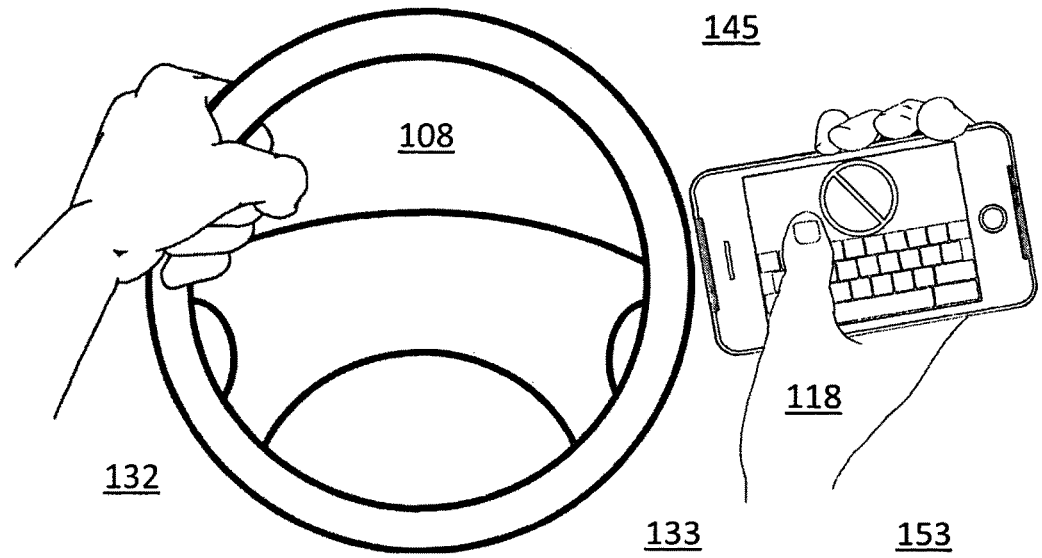

Looking at FIG. 14A, while in a landscape orientation, the driver would find it exceedingly difficult to use a single hand to hold the phone horizontally concurrent with the "adept" entry of text.

In support of the logic behind this premise, the landscape orientation is just too wide and unwieldy for a single hand to adeptly accomplish both of those operational feats simultaneously. The remaining hand would have to become involved as the method for text entry.

This obscure fact of "constantly" Involving Both Hands 127 in the operation of a "landscape" oriented phone will effectively prevent texting and driving and will be advantageously exploited as a significant aspect to the novel but simple method of applying the proposed restrictive technology of the subject invention. Requiring two handed involvement upon the phone will effectively defeat any attempt at single-handed grasping of the phone simultaneous with keystroke entry upon the keypad of that cellular phone by that same grasping hand.

The successful completion of this task, and most importantly its verification, is further bolstered through novel vital physical "additions" and adaptations to and for the phone itself.

Looking at FIGS. 7A-D, 8A-B, 9, and 10, in reaction to disqualifying any portrait oriented phone use, the first requirement of the additive portion of the technology is to mandate use of one or the other of the "phone grasping and use" configurations illustrated in FIGS. 9 and 10 for the placement of the user's hands upon a landscape oriented phone.

New additions to the phone, in the form of Contact Areas 135, are shown in FIGS. 7 and 8 that demand and verify that a hand or hands are placed upon opposing ends of the landscape oriented phone. In FIGS. 9 and 10, if hand contact at either end of the phone is removed, then the blocking technology will immediately be triggered and initiated thereby preventing any further keystroke entry until dual hand contact is re-established. This leaves No Idle Hand 128 that is left available for steering the vehicle concurrent with the capability to also enter keystrokes.

In FIG. 10, the new additions ensure that the grasping hand will cause and demand complete Thumb Occupation 130 with the retaining aspect of the landscape oriented phone thereby removing that thumb from any possibility of being additionally used as the medium for executing text entry. This ensures the remaining hand has to be utilized to enter keystrokes and thereby will "Not" leave an Idle Hand 129 available for steering the vehicle.

Constantly Occupying the Second Hand 131 of the user where both hands are consistently involved with the task for grasping the phone concurrent with the entry of keystrokes is highly pertinent and premium to preventing the commission of Texting and Driving 103. Thereby the technological plan is to employ methods for either actively or passively verifying the consistent involvement of both hands of the phone user while employing one of the two grasping configurations depicted in FIGS. 9 and 10. This would enable the technology to acknowledge a proper qualifying grasp and use by a Passenger 106 and thereby permit the entry of keystrokes. However in juxtaposition, the driver of the vehicle is disqualified from keystroke entry due to the required involvement of both hands in order to operate the phone which would preclude that driver from having a hand idle for steering the vehicle.

Active Control 132 is demonstrated in FIG. 9 through concrete verification of the placement of the user's hands upon opposing ends of the phone. If one hand is removed, Hand Contact is Broken 133 and the technology "actively" blocks further text entry.

Passive Control 148 is demonstrated in FIG. 10 whereby a first hand of the user satisfies the grasping aspect for the phone while the second hand remains available to execute the "entry of keystrokes" aspect that the first hand cannot accomplish for this particular grasping scenario. Should the second hand instead be used to steer the vehicle, then there is no capability for the phone user to both hold the phone simultaneously with entering keystrokes. This delivers a passive level of control for the prevention of texting and driving rather than the actual issuance of a blocking command that occurs in the Active Control 132 inherent to FIG. 9.

The methods employed by the technology either directly verifies involvement of both hands in FIG. 9, active control, or indirectly prevents the dual use of the second hand to conduct two activities simultaneously as depicted in FIG. 10, passive control. Specific to FIG. 10, the driver must choose to either abandon his attempt to enter keystrokes and drive in a safe manner or he must stop the vehicle in order for his phone to once again permit text entry. When traveling together within a "moving" vehicle while bearing phones equipped per the described embodiments of this invention, the following outlines a simple method and solution to the difficult and elusive problem for designing a Restricted Use Technology 100 that will "accurately" Differentiate 107 between the two phone user groups within the vehicle. The technology must discern between the two types of users and be capable of levying permission for any passengers to use their phones concurrent with preventing any driver from conducting the highly dangerous act of Texting and Driving 103.

The basic plan behind the preferred embodiment of the present invention for preventing texting, or other preselected forms of data entry by the driver while the "carrier vehicle" is in motion, is to necessitate that the following requirements/mandates be met by "any and all phone users" traveling within that vehicle in order to successfully enter keystrokes upon the virtual keyboards of their respective phones that commonly have the following restrictive programming model and plan intact.

As earlier stated, the first mandate is that while motion of the vehicle has been detected, the portrait and laptop mode for viewing the display screen are immediately disabled as specifically illustrated in 6B and 6C. An internal directive is embedded to block functionality for a phone positioned by the user in either Portrait Mode 124 or Tabletop Mode 125 and to reciprocally demand that the phone must be retained in a Mandated Landscape Mode 126 of orientation in order to view the virtual screen and keyboard. More importantly, it also dictates that the simultaneous act of holding the landscape oriented phone concurrent with keystroke entry solely by one hand becomes excessively difficult to the point of abandoning the attempt.

Viewing FIG. 7, the second mandate that must be executed concurrent with the first for retaining the phone in a Mandated Landscape Mode 126, specifies the following. Designated Contact Areas 135 comprising at least two touch sensitive contacts for the detection of specific positions of "hands upon the phone contact" are mandated and integrally provided upon the phone casing near the middle of the two short sides of the rectangular shaped phone. These points of contact would generally be electrically conductive and may enclose or displace during manufacture the normal locations of other "end of phone" mounted components or interface connections, such as a Charge/Docking Port 155 or an Earphone Jack 193, in order to occupy the preferred middle area location upon the two ends of the phone.

The purpose of these contact areas is to "prove" a sustained qualifying grasp of the phone user's hand or hands across these contact areas. A correctly executed and maintained grasp by the user in concert with holding the phone in a landscape orientation permits the entry of keystrokes as desired. Not until this grasp is broken will the underlying blocking technology prevail and activate thereby instantly preventing any further keystroke entry.

At this point it should be elaborated upon that the restrictive technology of this invention mandates that a particular configuration and duration of physical hand grasp has to be executed upon the phone by the user in order to nullify the prevailing blocking activity. A qualifying hand grasp that has to be "maintained" directly upon the phone and therefore is an enduring "elective interval" type of contact whose length is dictated by user compliance and continuance of that qualifying grasp. There is no "momentary" contact that simply switches the blocking activity off.

Therefore the length for "maintaining" the hand contact upon the phone is decided by the user and must be enduring, continuous, and without interruption in parallel with the periods of time that keystroke entry is desired. Switching the blocking activity off through "momentary" hand contact is not an option nor is it effective as a texting and driving preventive measure such as other conventional restrictive phone systems currently allow.

Additionally, novel methods are employed for the consistent and accurate identification of the desired "two hands involved" grasps by the phone user upon his or her phone that combine active and passive methods for controlling the application of the blocking technology. The methods and means for recognizing a correct "qualifying" hand placement upon a phone and as a result either "actively" blocking the entry of keystrokes or "passively" making it impossible for the user to successfully employ both hands to conduct the simultaneous task of retaining the phone, entering keystrokes, and steering the vehicle, are unique this invention. In direct response to the configuration of the hand grasp chosen by the phone user while under the umbrella of restrictive protection provided by portrait and tabletop disablement in combination with the inclusion of hand contact sensory areas upon the ends of the phone, provide the programming stimuli for either keystroke denial or permission through either active or passive means. Their collective function results in blocking the phone user from having the capability to "Text and Drive". This unique combination of technologies and operative methods has not been offered before and is exclusive to the present invention.

The scope of the Contact Areas 135 are illustrated in general in the various landscape oriented perspective views portrayed from the Front Face 137 of the phone in 7A and 7B and the phone's Backside 138 in 7C and 7D. These designated areas and points of body contact upon the phone would mainly involve some portion of the Backside 138 and End Surfaces 185 of the phone. However that generalization should not preclude or limit the contact areas from also occupying some portion of the phone's Front Face 137 or from increasing their number to more than two as depicted in 8A and 8B, should it be determined as beneficial in the restrictive control of any phone, or other wireless device, as additional or alternative restrictive control methods or for other usage parameters that might be determined for future devices.

The front surface, and for some phones the backside, is generally constructed of a continuous rectangular sheet of clear shatter resistant glass selected for optimum viewing of the phone's virtual display. Should it be desired that front surface exposure of these hand contact areas need also be included upon the face of the phone; a pocket may be prepared to house the contacts within and flush with the surface of the glass or any other material that jointly possesses the proper optical clarity and break resistant characteristics.

During the assembly procedure by the manufacturer, these exterior contact areas interface internally with the central co-processor and/or other sub system logic control instruction units through phone circuitry that relays measurements of change in capacitance, inductance, and/or continuity. The interfacing circuitry for the contact areas would generally be contained internally within the interior of the phone however that would not preclude that some portion of the circuits could traverse or be embedded within an exterior surface, such as the elongate expanse of the back plate or along the length of and/or inclusive of a sidewall or sidewalls of the rectangular phone casing.

The interfacing circuitry could additionally involve or emanate from a secondary protective housing layer or layers that are commonly used to encase the phone in order to provide dust, moisture, scratch, and impact/shock resistance or prevention thereof. These secondary retrofit exterior housings that protect the phone from damage will also have novel physical adaptations to allow hand access to the contact areas and will be described in later detail in FIGS. 18, 19, and 20.

In addition, a number of phone designs with real keyboards generally do not employ any type of additional "retrofit" protective enclosure but instead utilize a closure of their own body portions as exterior protection during periods of non-use. Upon the need for the phone user to access and utilize the interior lying keyboard and/or virtual screen, the component portions of the body undergo positional changes that generally employ either a "sliding design" where the phone has dual sliding components or a "flip phone" where the phone utilizes a body construction that folds open or closed. Both of these phone styles are well known to the art where each permits positional changes in their body alignment and present additional options for locating the contact areas. For example, the contact areas can be integrally located upon the ends of an interior surface of one portion of the flip phone whereby upon opening and folding back that portion 180 degrees against the other half, place the contact areas on the exterior where they can be accessed by the hands of the user. The general rectangular shape of these folding types of phones lend themselves to having a hinge that can either fold and close across an end of their shorter length or alternatively can fold along an edge of their longer length. To the point of this invention, upon opening and closing either a sliding or a folding style of phone, unique options are presented for respectively making or breaking the necessary interface connections between the contact areas carried by the sliding or folding portion to and with the body portion of the phone that carries the computer processor, logic controls, and related circuitry.

Use of onboard co-processor configurations that reduce battery drain by redirecting and assuming some of the computation and operational burden from the central processor are additionally anticipated as highly beneficial to the efficient control and operation of the circuitry involving the integral hand contact areas.

Viewing FIG. 13, either one hand or two hands must be used to simultaneously engage both contact areas of a landscape oriented wireless device and thereby temporarily deactivate the blocking technology. In order to "prove" the user is maintaining consistent hand touch across these contact areas, differential variances in capacitance or inductance can be measured for validating the uninterrupted existence of a qualifying hand grasp that would temporarily nullify the underlying blocking technology concurrent and consistent with the duration of maintaining that touch. Keystroke entry will "only be allowed" in concert with continuing the unbroken maintenance of that human body contact and grasp across those contact areas.

Figure 13A:
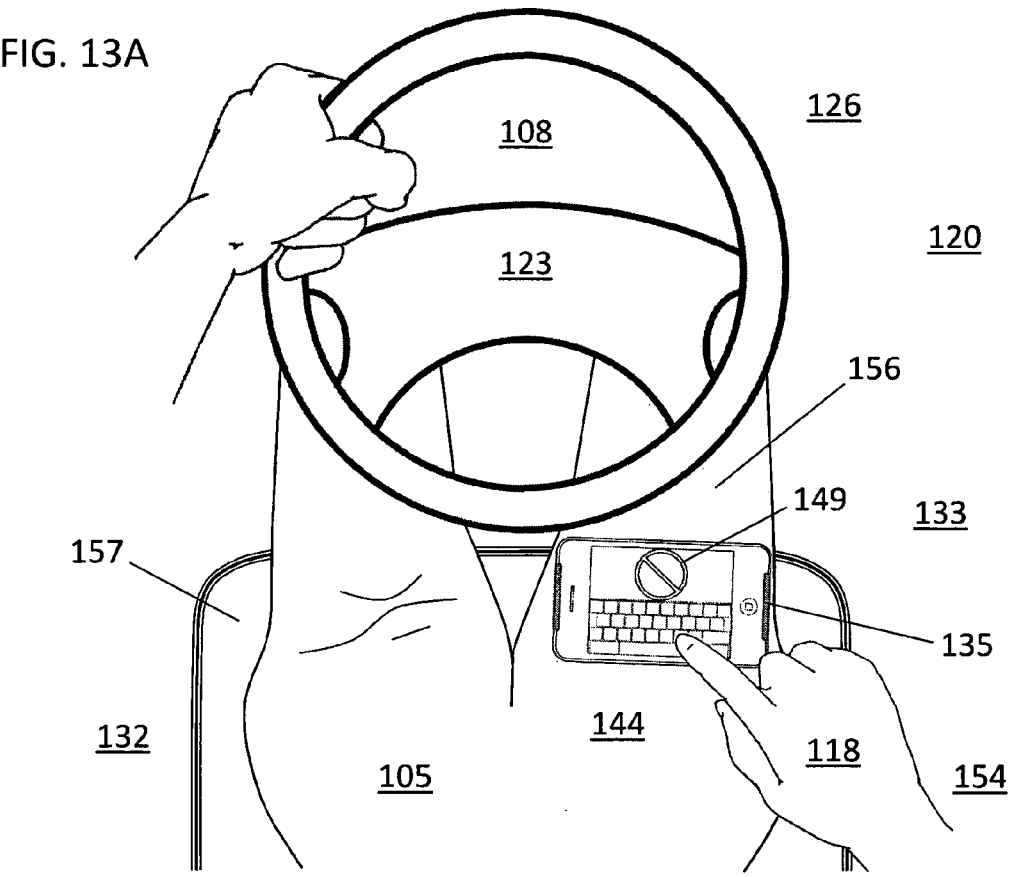
Figure 13B:
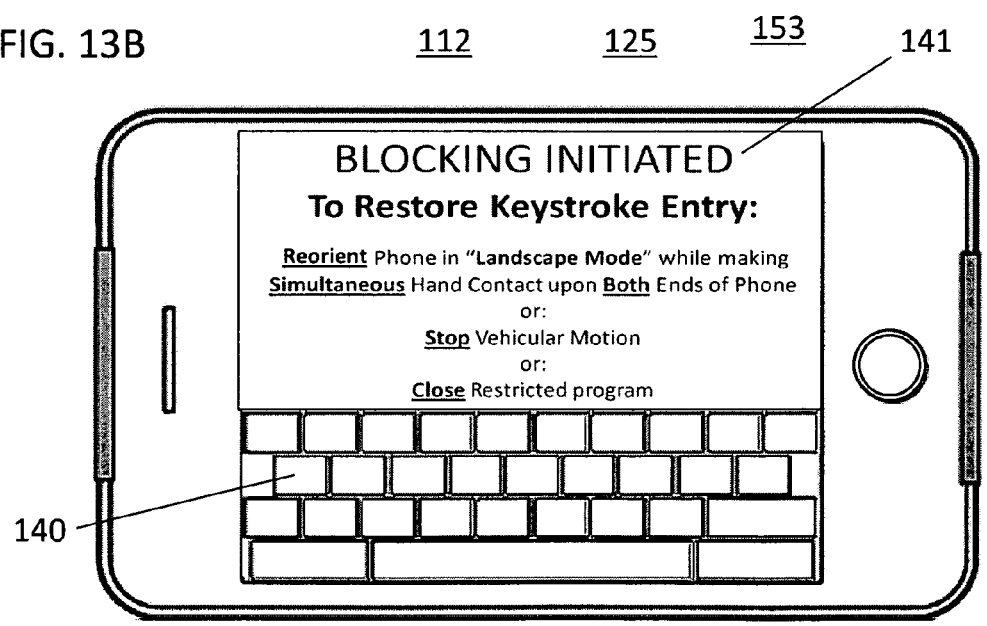

As depicted in FIGS. 13 and 13A some other body portion, such as across a bare Thigh 156 of the driver's leg, may be used in the reckless attempt to satisfy the just described human contact requirements while continuing the dangerous driver elected activity of entering text with one hand while using the remaining free hand to execute steerage of the vehicle. In fact one of the most clandestine and often used texting positions employed today is promoted by the desire to avoid the line of sight from passing law enforcement and is depicted in FIG. 13. Phone placement upon the driver's leg is also the primary reason that disabling tabletop mode is included in the design scheme for this invention. If the texting while driving problem is addressed solely from a software approach for a phone not equipped with the proposed hand contact areas, then banning table top mode is a necessity. If the wireless device is equipped with the hand validating contact areas then a laptop orientation ban would not be necessary due to the user not being able to satisfy a sustained hand contact upon the phone while on the leg.

The long "flat" backside of a landscape oriented phone would rock back and forth across the "convexity" of the thigh. Use of this phone position to attempt the simultaneous completion of body contact across both ends of the phone would simply not be possible due to the length of the expanse between the contact areas upon the back surface of the phone and thereby would not allow the driver to circumvent the phone restrictive technology for an enduring hand contact.

Anytime a phone user either deliberately or unintentionally breaks the chain of hand grasp across the contact areas, a blocking action will be triggered and immediately initiate to prevent any further keystrokes until a qualifying hand grasp across both contact areas is re-established. Concurrent with the institution of a new qualifying grasp that engages both of the contact areas, phone use and keystrokes are once again immediately, or within a short interval, allowed thereby Permitting Texting 121 upon the landscape oriented wireless device. Also, should the vehicle be stopped, full phone use will be restored per the time interval elected by manufacturer design for restoring full phone use and permitting keystroke input without regard to phone orientation or grasping requirements until vehicular motion is once again initiated.

Any potential "user" of this specially equipped wireless device, inclusive of but not limited to the phone owner, must maintain constant simultaneous hand contact upon and "across" both of these integral touch sensory areas concurrent with the phone being retained in the landscape orientation in order to temporarily nullify the restrictive programming for the phone while the vehicle is in motion thereby enabling the manual entry of keystrokes by that phone user.

However, if the phone user is the driver of the vehicle, he will simply be unable to fulfill all of those demands concurrent with still having a free hand available to steer the vehicle. The collective "inability" of the driver to perform all of these actions simultaneously will thereby preclude the execution of the life endangering action of "texting and driving" that has been targeted for prevention by this invention.

Otherwise stated, while the vehicle is traveling, if the phone user is "unable" to fulfill the mandate for involving "both hands" in the all encompassing task for retaining a landscape phone orientation, simultaneous with completing and "maintaining" a hand grasp across the dual contacts upon the phone, concurrent with the adept entry of keystrokes, then the immediate activation of the dormant restrictive programming for the phone would prevail and prevent/deny keystroke entry.

Those requirements are easily met by a passenger upon his phone while traveling within a moving vehicle. However, in the case of the driver, if any of those mandates are not satisfied concurrent with the others, then the prevailing restrictive instructions for the phone would rule and keystroke entry would be blocked thereby removing the driver's ability to text and drive.

Viewing FIG. 8, portrait oriented views of the Front Face 137 and Backside 138 of the phone are respectively shown in 8A and 8B. These illustrations depict end views of the same Contact Areas 135 displayed in FIG. 7 that can either surround any of the "end of phone located" interface ports, such as the Charge/Docking Port 155, or displace them to other manufacturer chosen locations. You will notice that the front view of the phone depicted in 8A has a Blank Screen 139, without display of any virtual keys or keyboard, due to the portrait phone orientation being excluded from use thereby providing indication to the user that keystroke entry is currently not being permitted. Additional methods of indication and explanation to the phone user of any such keystroke blocking activity are further illustrated forthcoming. Also depicted in both 8A and 8B are contact areas on the end of the phone that are split into Multiple Contact Areas 136. These individual contact areas that are independent without electrical continuity can be utilized to analyze different grasping configurations of the hands and fingers and, more importantly, whether one or two hands are being used to grasp the phone in compliance with the requirement that simultaneous hand contact be maintained at both ends of the phone.

It is additionally anticipated that the just described contact areas illustrated in FIGS. 7 and 8, that are integrally situated and interspaced upon the casing of the phone exterior, would work equally well upon future phones that would possess bendable frames. The circuitry that connects and interfaces with and between the contact areas and the internal processor and logic control board would adhere and conform to the standards of function and reliability set for the bendable frame of the phone itself.

Now viewing FIG. 10, orienting the phone in the Mandated Landscape Mode 126 crucially ensures that the spacing between the two Contact Areas 135 on either end of the phone is sufficiently large that they cannot be easily bridged with "one" hand, as depicted in FIG. 10, and "still agilely engage" the Virtual Keyboard 114 with that same hand. The human hand is not large enough to span and touch both of these ends simultaneously and still allow the finger(s), generally the thumb, of that grasping hand to access and "adeptly" initiate keystrokes upon the virtual keypad of the phone's Virtual Screen 113. It is simply a physical and dexterous impossibility. However the user may attempt another texting position utilizing a one handed grasp of a landscape oriented phone.

Figure 14B:
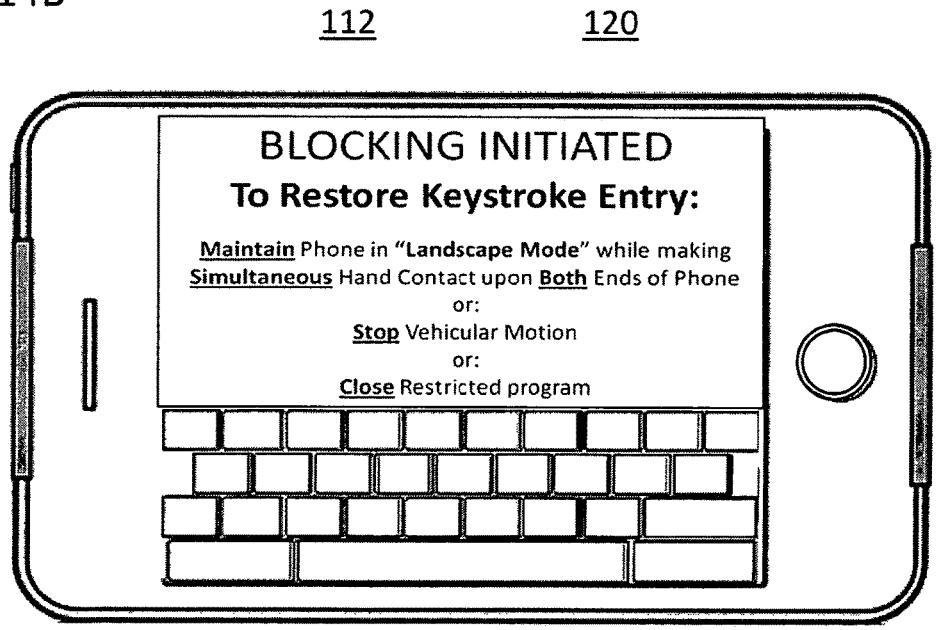

Viewing FIGS. 14A and 14B, the phone user may instead choose to employ a single handed grasp of the phone, as depicted in FIGS. 14 and 14A. The hand is placed behind and across the long sides of a landscape oriented phone. This text entry configuration is similar to a 90 degree rotation of the portrait oriented phone and single hand use configuration employed in FIGS. 11 and 11A. However it differs in that it is much less ergonomic as a one hand combined grasp and keystroke entry method. In the eventuality that it is attempted it is simply and effectively blocked due to an Improper Grasp 153 that exhibits a Broken Hand Contact 133 where the user does not touch either of the hand touch sensory areas even though the proper mandated landscape orientation is utilized. 14A also demonstrates the vital nature of including the dual contact areas as integral components upon the phone to effectively block any attempt at one handed text entry while in the landscape position. An appropriate phone user message is depicted in 14B indicating initiation of the blocking activity and how keystroke entry can be restored.

Looking at FIGS. 9 and 10, methods for using two hands to grasp the phone concurrent with the adept entry of keystrokes in order to temporarily nullify the prevailing "restrictive use" technology may be executed in either one of the following two configurations and manners.

Specifically viewing FIG. 9, one grasping configuration designates the placement of one single hand upon each of the opposing ends of the phone thereby engaging both of the respective "contact areas" situated upon those ends.

Use of a separate hand to grasp each end of a phone held in a landscape orientation happens to coincide advantageously with the preferred and most efficient method for most people to rapidly execute multiple entries of individual keystrokes upon their phone.

In order to execute this frequently used texting method, the phone is oriented and held in landscape mode with separate hands placed upon the designated contact areas on either end in a freehand "without brace" grasp where both thumbs are available in optimum positioning for expediting the accurate entry of text. In this phone grasp position, the thumbs have an inherent degree of high mobility and dexterity that make them particularly well suited to execute quick and nimble keystrokes upon the virtual keyboard.

While retained in landscape orientation, the virtual keypad is larger and easier to see with more abundant spacing between the individual keys thereby reducing keystroke entry errors. This elongated side to side positioning of the virtual keyboard more accurately imitates the natural two hand typing approach utilized for a full size rectangular layout of a QWERTY keyboard where the right and left thumbs substitute respectively for the adept typing positions of the right and left hands.

These dimensional and orientation facts make the method of Two Handed Texting 119 shown in FIG. 9, a highly popular and accurate keystroke entry technique.

Now specifically looking at FIG. 10, the remaining alternate "grasp upon the phone" configuration that temporarily nullifies the blocking technology and enables successful keystroke entry may be employed by the phone user either out of necessity or simply through preference.

Those individuals that have a thumb size that exceeds the interspacing between the individual keys of even the larger "landscape oriented" virtual keyboard are normally limited to use of one of their smaller fingers, generally the index finger, to accurately execute keystrokes and avoid crosstyping. In order to satisfy the just stated grasp and orientation requirements for this particular group of phone users, a single hand is generally used to grasp across the longer length of the landscape oriented phone thereby making simultaneous hand contact with the two contact areas integrally situated on either of its ends. In order to execute this single hand grasp across the wide side to side expanse of the phone, the thumb of that hand importantly has to be used in order to achieve that grasp thereby totally Occupying that Thumb 130 and removing it from any possibility for its dual use for both grasping and the concurrent entry of text. Even more important is the fact that the remaining Second Hand is Occupied 131 and Not Idle 128 since it is used as the medium for entering keystrokes and thereby is "not available" to be used to steer the vehicle concurrent with texting.

Figure 11A:
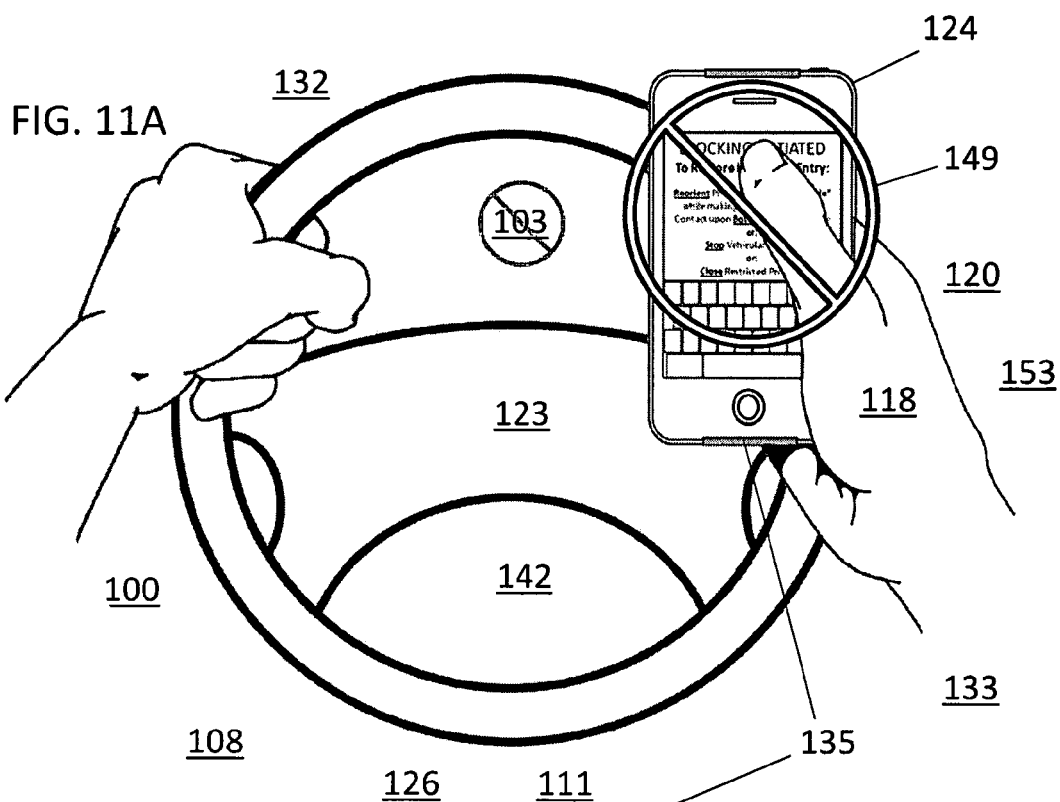

This ergonomic fact is in direct diametric opposition to the portrait orientation of the phone previously shown in FIG. 11A, where the entry of text by the thumb concurrent with one handed grasping of the phone across the shorter side to side distance of the display is easily and adeptly executable. In fact, this method of portrait oriented phone grasp and text entry is probably the most often used phone/hand configuration to commit the dangerous "distracted driver" action of typing in text while operating a moving vehicle. It is also the exact reason why the portrait orientation for phone use is excluded by the plan for the restrictive scheme of this invention.

Still viewing FIG. 10, this one handed grasping configuration across the two contact areas of a phone held in landscape mode fulfills the concurrent body contact and orientation requirements for the phone while freeing the remaining hand for utilizing whichever finger preferred for tapping in the desired individual keystrokes upon the virtual keys of the phone display. This method of using one hand to grasp the phone thereby enabling the free hand to enter keystrokes, a "hold and peck" technique, is often preferred by a number of users regardless of their particular finger size. However, should the "landscape" end to end length of some models of phones be so wide that a user with smaller hands has difficulty using one hand to either bridge the length of the phone or simply cannot make simultaneous contact with the two designated contact areas while retaining the phone securely enough that the remaining hand can enter keystrokes, then the previously described two handed grasping configuration shown in FIG. 9, would always remain available and recommended for that particular phone user.

Employing whichever of the just described "hand placement upon the phone" configurations where either a "single hand or a double hand grasp of the phone is executed", fully complies with and satisfies the mandate for simultaneous hand contact to be maintained upon or across each of the novel contact areas situated at either end of a phone while that phone is being retained in landscape mode simultaneous with keystroke entry. The concurrent fulfillment of these mandated requirements upon a "restricted use" phone that is currently being carried within a moving vehicle enables that particular phone user to successfully enter keystrokes upon their phone. This fact is directly applicable and vitally important for phone use by a Passenger 106 traveling within that moving vehicle in order to guarantee the availability and successful use of any and all features of their phone.

Most importantly, employing either one of these grasping, orientation, and keystroke entry configurations and techniques fully Involves Both Hands 127 of the phone user and thereby ensures that the driver of the vehicle has No Idle Hand 128 available to place upon the steering wheel and guide the moving vehicle concurrent with the remaining hand both retaining the phone and simultaneously entering data. The driver therefore cannot Text and Drive 103.

In fact, the capability of any phone user traveling with the same moving vehicle to fulfill all of those mandated requirements at the same instant is the primary method employed, exclusive to this invention, to Differentiate 107 between the Driver 105 and a Passenger 106.

Figure 15A:
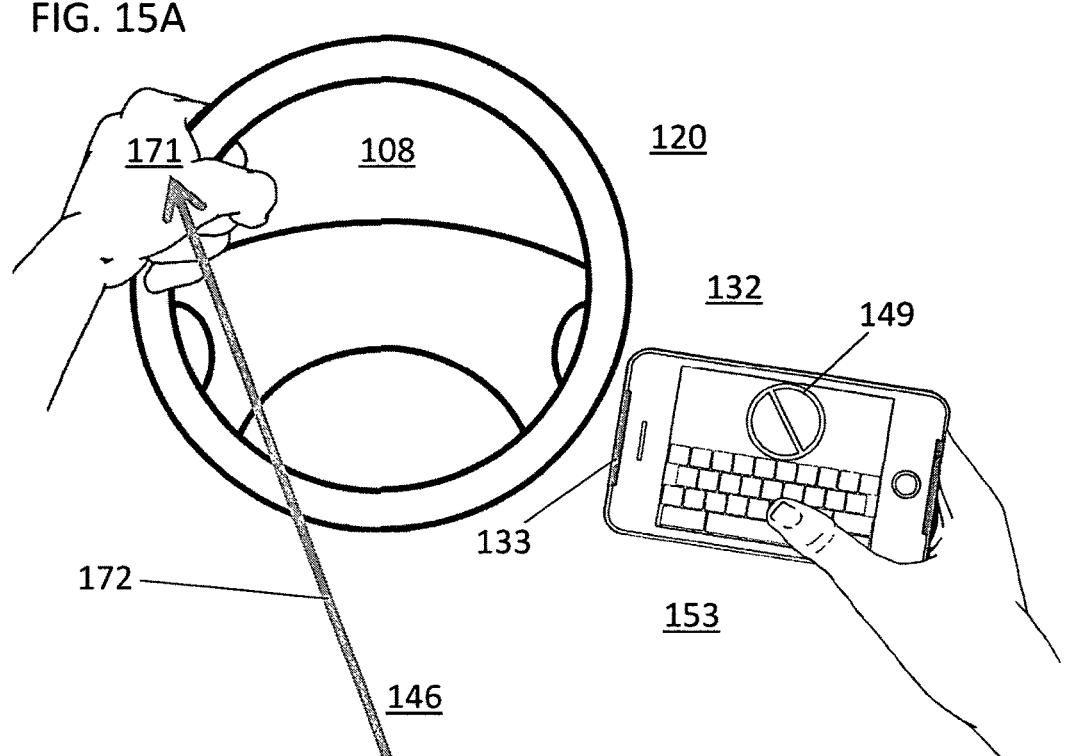
Figure 15B:
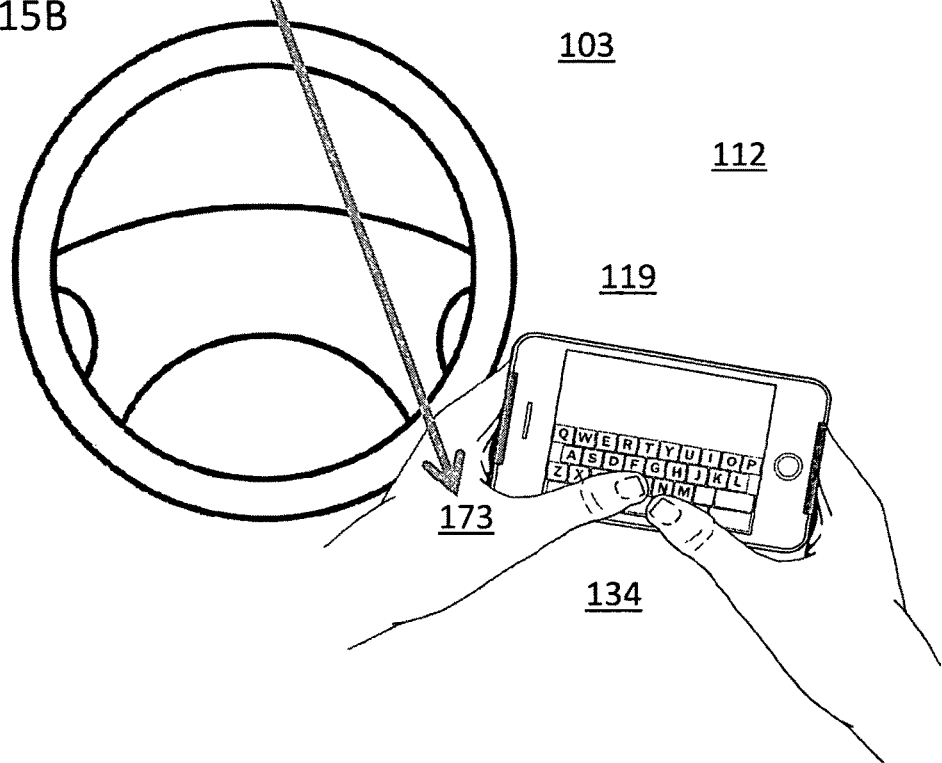

Now viewing FIGS. 15 and 15A, the phone handling configuration illustrated in this depiction of texting while driving utilizes a revolving Off/On Steering Wheel/Phone Grasp 146 and is a particularly risky maneuver.

In 15A, the illustration shows how the driver may place one of his hands on the steering wheel while using his remaining hand to retain the landscape oriented phone in preparation of his intention to Enter Keystrokes 173 while the Vehicle is in Motion 108.

The driver makes a last observation of the highway and a corresponding guidance correction before quickly releasing the steering wheel and Abruptly Shifting his Arm 172 and hand to the vacant end of the horizontally oriented phone that he currently retains with his opposing hand. He then quickly enters a limited number of keystrokes before releasing the phone and returning the arm and hand back to the steering wheel for a refreshed Interval of Roadway Observation and Guidance 171 for the vehicle. He then repeats the process until completing and sending his texting message.

This texting and driving configuration is easily and effectively thwarted by the subject invention. 15A shows the initial drivers position of grasping the steering wheel while retaining the horizontal Landscape Oriented 112 phone with the remaining hand. However, as you can see in 15A, the depicted phone is currently under a restricted state shown by the "No" Texting Symbol 149 due to one of the contact areas upon the phone being open. The presence of this Broken Hand Contact 133 initiates an Active Control 132 command for a Texting Blocked 120 status.

In order to remove the blocking state the driver would have to remove his hand from the steering wheel to satisfy the demand for sustained hand contact upon each end of his phone as shown in 15B. Upon establishment of that dual contact, the wireless device would only recycle and release the blocking state after a specified period of a few seconds. However by the passage of that interval of time the driver must again return his attention back to the roadway to once again make steering corrections.

The dual requirement for mandating a sustained contact upon both of the phone's sensory areas in collaboration with the mandated landscape orientation of the phone will effectively block this texting position.

Although release of the steering wheel is highly illogical from a safety standpoint, a technology that is all encompassing must cover all of the possibilities and derivatives for text entry that a user might attempt should he persist in his quest to find a way to continue his illicit commission of texting while driving.

The majority of phone users would never attempt this type of texting position due to it involving the release of the steering wheel but as stated all possibilities must be covered and solutions offered in order to provide universal protection against the small number of users that remain highly determined to find a way to continue the dangerous and addictive driving habit of texting and driving.

Looking at FIGS. 11A, 12A, 13A, 14A, and 15A, upon a blocking action being initiated for any "open and in use" phone program due to the presence, sensing, and/or non compliance with any of the previously described operative parameters, it is preferable to immediately inform the phone user that a blocking action has being initiated in lieu of the appearance of a Blank Screen 139 or a keyboard that simply no longer accepts the entry of keystrokes.

This is accomplished, exclusive to this invention, by defining certain phone handling parameters and/or options. A manufacturer may choose to program the phone with conditional use restrictions where any shift in the user's grasp that causes the chain of qualifying hand contact to be broken with a properly oriented phone either causes instantaneous blocking or alternatively it may allow for a certain short interval of time, ex. around 2-3 seconds, to pass without engagement of the blocking activity. Additionally, if that short interval is exceeded, then a period of new qualifying sustained contact, ex. 5-10 seconds, has to be re-established before the prevailing blocking activity will be nullified and keystrokes permitted once again.

To inform the user of the status of these time intervals, a visual numerical countdown can be displayed coupled with a complimentary parallel auditory beeping if desired. These methods for providing the user with current time intervals and other phone status information may be coupled with the display of other novel blocking messages.

The illustrations all show similar virtual display messages that aptly indicate that a "Blocking Initiated" or other similar message illustrating that the restrictive technology has commenced and is currently active. Indication of the actions required to correct and restore the phone user's ability to enter keystrokes are also provided. Further indication of a blocking state is accomplished by showing a prominent and easily discernible graphic change of the virtual keyboard outlining individual keys with all of the numeric and alphabetic symbols removed as "ghost keys". This Gutted Keyboard 140 image coupled with a short Blocking Initiated Graphic 141 message would be standardized to clearly convey to the user that a blocking condition is currently in effect that prevents any further entry of keystrokes.

Another unique image seeking a standardized level of indication and usage would show some portion of the phone's virtual screen or keyboard overlaid with the image of the popular "No Symbol" 149 (circle with a diagonal line running from top left to bottom right). The direct display of a "No" symbol, or its transparent overlay, would indicate in the example illustrated for 11A that the temporary removal of "portrait mode" as a user/phone data entry exchange option is presently in effect. Ditto, for standardizing indication of the current "non-available status" for the keyboard of a landscape oriented phone should a disallowed activity in the handling of the phone be sensed and a Blocking Initiated 141 status be enacted.

Fluidics technology can be employed as an indicative measure through the appearance of raised keyboard lettering upon establishing proper hand contact upon the phone indicating that keystroke entry is currently permitted. Conversely, any improper handling or phone contact would trigger the initiation of the blocking technology which would be indicated by the deflation of the raised keys. The fluidics "raised surface" technology can be employed in some capacity upon or as the contact areas themselves.

It should be noted that the exceedingly large "no" symbol representations shown in FIGS. 11A and 12A are used "only" as symbolic indicators for those particular drawings in order to demonstratively illustrate to the reader of this specification the full intent to "disallow" those particular "phone use" orientations, positions, and grasp configurations. They are not to be misconstrued as representative of any "real world" use. However, the smaller symbols limited to being displayed upon the virtual screens of the phone as described in the preceding and as illustrated in FIGS. 13-15, are fully intended for actual usage.

Still Viewing FIGS. 9 and 10, while the vehicle is moving, the novel design fact for requiring the phone users hands to grasp the contact areas upon the ends of a phone oriented in landscape mode in order to enable the simultaneous entry of keystrokes ensures that the other vehicular occupants that possess similarly equipped "restricted use" phones and are mutually being carried within that same vehicle or any other form of transit platform, will all retain their capability to text. All passengers within that vehicle can still "freely" enter any keystrokes they desire through conforming to one of the illustrated "hand grasp upon the phone configuration techniques" that cooperatively satisfy the proposed grasping, orientation, and keystroke entry requirements for temporarily disabling the phone restrictive technology of the present invention. The passengers may also access the remainder of their "unrestricted" phone features through any orientation or grasp of the phone they desire.

In addition, it is realized that the driver may still seek to circumvent the nullifying effects that the proposed keystroke blocking technology has upon texting while driving.

If two hands must be employed to achieve the concurrent tasks for holding both ends of the landscape oriented phone while entering keystrokes, then the driver's options are reduced to another of the favored positions for continuing his effort to text while driving.

Figure 12:
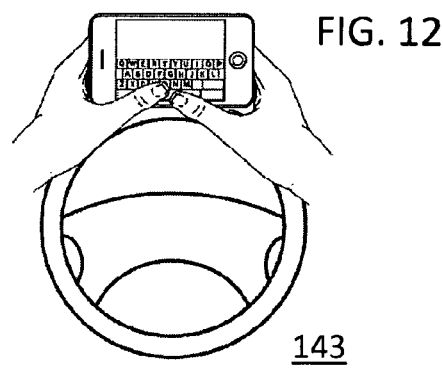

Viewing FIGS. 12 and 12A, illustration is made in 12A for how the driver could still attempt to hold the phone via a two hand grasp while simultaneously trying to turn the steering wheel and guide the vehicle.

The method employed for executing this unwise attempt at Two Handed Texting 119 and driving is to hold the phone in contact with the top, bottom, or some other part of the steering wheel near its outer rim. While retaining the phone in that position some portion of the two hands and fingers that are not grasping the phone, in particular the heels of the palms and the pinkie fingers, are used to contact and turn the steering wheel during the ill conceived attempt to simultaneously guide the moving vehicle and continue texting.

This hand/phone type of placement and contact with the top portion of the steering wheel entails a relative close proximity to the face and eyes of the driver. The stimulus to mutually situate the phone and hands upon that particular uppermost spot near the top of the steering wheel is due to the driver's pursuit of the best location to quickly alternate his view between the phone display and the driving environment. He seeks this point to best observe "both" the phone and the roadway because "theoretically" he is not bent on committing suicide. This particular location and phone positioning offers comfortable access for keystroke entry in combination with superior leverage for turning the steering wheel in order to guide the vehicle while continuing to text. It is also an effective recipe for becoming involved in an injurious or fatal accident.

In anticipation of that fact, this highly dangerous act is preemptively anticipated and a preventive solution is illustrated in 12A that will nullify keypad entry upon any phone contact with the steering wheel should it be attempted.

This often used texting and driving position is defeated through a unique combination of sensing technology within and integral to the phone that cooperatively recognizes the general parallel angulations between the face of the steering wheel to the face of the phone as it is being retained upon that steering wheel. Importantly, it recognizes any generally parallel bi-directional rotary motion and, most importantly, the presence of any rhythmic vibrations. These are the triggers employed by the present invention to initiate the blocking technology as defined forthwith.

It is recalled that the basic operative premise for the phone dictates that upon "vehicular motion being positively ascertained" that both hands must remain involved in fulfillment of the requirements for orienting the phone in landscape mode concurrent with maintaining a grasp across the contacts at either end of the phone in order to enable the simultaneous entry of keystrokes upon the keyboard. In parallel with those prevailing factors and commands, the preceding additional sensing capabilities are included within the design architecture of the wireless device to also detect any phone motion in parallel to the bidirectional turning and guidance of the steering wheel and/or any motion(s) induced upon the phone resulting from its direct or semi-direct contact with the steering wheel.

A "phone based" accelerometer, gyroscope, tilt sensor, and/or compass system, or other motion and/or orientation sensing method(s) and/or other hybrid combination(s) of technologies are anticipated and included in the preferred embodiment of the present invention for addressing the sensory needs required to determine that the vehicle is "in motion" in combination with defeating the driver/phone/steering wheel position(s) and configuration illustrated in the example shown in FIG. 12A.

One sensory method detects any "gross" back and forth Axial Rotation 150 of the phone that is mutually made in generally parallel unison with steering wheel rotation and guidance that correspondingly causes changes in the compass setting of the phone indicating a comparable change in the direction of travel for the carrier vehicle.

Predicting and associating a generally matching degree of Parallel Verticality 151 for detecting steering wheel and phone mutual rotation and motion would be supplementally supplied, supported, and determined through "on board" tilt sensing capabilities that may be stand alone or in combination with other axial orientation, positioning, and motion determinations by various combinations of accelerometer(s) inter or intra-function.

Still viewing FIG. 12A, it is also recognized that during travel upon straight stretches of roadway that there would be a minimum of reciprocating steering wheel motion taking place. It is also additionally recognized that certain laws of physics prevail that make distinguishing between any rotation measurement and detection by the accelerometers upon the respective phones of the driver and passenger a particularly difficult task for differentiating between which user is actually the driver. With these facts in mind it is offered that the following sensory detection method(s) be viewed as primary to the solution for the dangerous driver/phone positioning attempted in FIG. 12A.

Any intimate contact by the hands and phone directly upon the steering wheel will always transfer highway induced Vibrations 152 that would be easily distinguishable from a phone held autonomously from that steering wheel, such as the passenger's phone, where such vibrations are damped by intermediary hand, arm, and body contact.

These constant "feel of the road" steering wheel transferred vibrations cannot be completely blocked or masked. Detection capabilities can be attuned to sense a particular range, wave, or intensity of telltale road travel that would include persistent oscillating and/or rhythmic sensing similar to the ability to detect small seismic anomalies, vibrations, and/or mild shaking movements.

As indicated, Vehicular and/or Highway Rhythmic Vibration 152 detection would be the principal method of determining and defeating the drivers attempt at using a hand/phone configuration that is placed directly upon the steering wheel as shown in FIG. 12A. It is appreciated that recognizing any alternating rotation of the phone in parallel with the turning of the steering wheel by the driver would be somewhat difficult to distinguish from the inertia induced swings of detected motion sensed by the accelerometer(s) within any of the passenger's phone(s) that are triggered by direct reaction to the turning movements of the car in parallel to steering wheel guidance. Since all persons and objects, and therefore all phones, are located within that same moving vehicle, they must all similarly act as "one master object in motion" to and with any changes in vehicular direction. These directional changes would immediately apply similar "resistance to change" inertia forces upon all of the accelerometer(s) whereby their corresponding sensory obtained measurements would all indicate similar motion indications and findings for all of the phones mutually traveling within that same moving "carrier" vehicle. These facts would make the detection of phone rotation a more difficult to distinguish finding between the driver's phone and the passenger's.

Vibration detection is a more accurate sensing since it interprets rhythmic vibrations sent directly through a generally rigidly attached member, such as the steering wheel, that is in intimate interconnection to the vehicle's wheels rolling upon an imperfect road surface. The steering wheel is also indirectly connected and supported by the frame of the vehicle that additionally transmits the rhythmic pulsations of the vehicle traveling upon the highway and the corresponding rapidly spinning drive train components. All of these steering wheel transmitted vibrations are directly and easily sensed by the driver's phone during any periods of time that it is being retained upon the steering wheel by the driver. Conversely, the passenger's phones are mandated to be retained by that passenger in one of the qualifying "hand(s) across the contacts" positions depicted earlier in FIGS. 9 and 10. What makes this fact especially important is that all of the phones held by any passengers traveling within the vehicle are damped by the body, and in particular by the arms and hands of the passenger, in an indirect and free form "non-rigid" fashion. This would make obtaining differential measurements for the sensory determinations between the two user groups traveling within the same vehicle, highly distinguishable. Additionally important is that these differentials in sensing measurements are easily and reliably obtained and consistent between the driver's phone and the phones of the passengers without support or need of any auxiliary vehicular hardware.

However, it remains the plan of the preferred embodiment of the present invention to offer the vibration detection technique in combination with the cooperative detection of parallel phone angulations and axial rotation to that of the steering wheel as depicted in 12A. Together these detection techniques would perform well in mutually determining the presence of the undesired hand/phone positioning in relation to the steering wheel. In collaboration, these orientation and motion detection techniques would accurately sense phone/steering wheel contact and in addition recognize the active guidance of a vehicle traveling upon the roadway and thereby quickly initiate an Active Control 132 keystroke denial command.

Blocking and exclusion of this particular phone/steering wheel positioning where Parallel Verticality 151 of the steering wheel to the face of the phone and/or Axial Rotation 150 and/or shaking motion(s) and/or rhythmic Vibrations 152 that are detected through any of the afore sensing techniques would immediately override the previous permissive keystroke entry instructions.

Since the phone and hands are generally in direct contact with the steering wheel itself, both the rotational sensing and the rhythmic vibration sensing aspects of the wireless device are not precluded or negatively affected by a vehicle that is equipped with a "tilt-angle" steering wheel system that offers various drivers of the vehicle the capability to adjust the angle of the wheel to their personal satisfaction and/or to relieve body positional fatigue.

Additionally, the steady advancement toward new vehicle designs that employ electric motors would not be of particular concern to the sensory capabilities for the subject invention since engine vibrations are not indicative of vehicle motion as the car engine may simply be idling. It is, however, of primary importance to detect wheel component turning and transmission of roadway surface imperfections while the vehicle is in transit and correspondingly indicate that a phone is being used upon the steering wheel and that a blocking command should be initiated.

With the inclusion of this specialized motion sensing programming for the wireless device, texting and driving is blocked due to being attuned for "no tolerance" monitoring for any rotation/vibration, or other disallowed sensing, for phone contact occurring either directly or indirectly upon the steering wheel of the "carrier" vehicle while that vehicle is in motion.

Although not the preferred embodiment, it is further planned that other internal programming of the phone could also be used to recognize any direct contact between the steering wheel and the hands concurrent with maintaining the required grasping and orientation of the phone through adaptation in the phone itself and/or the vehicle's steering wheel system. These additional sensing adaptations would thereby actuate an alternate or additional sourcing for initiating the restrictive command(s) for preventing keystroke entry while the phone either directly contacts or approximates contact with the steering wheel.

Figure 11B:
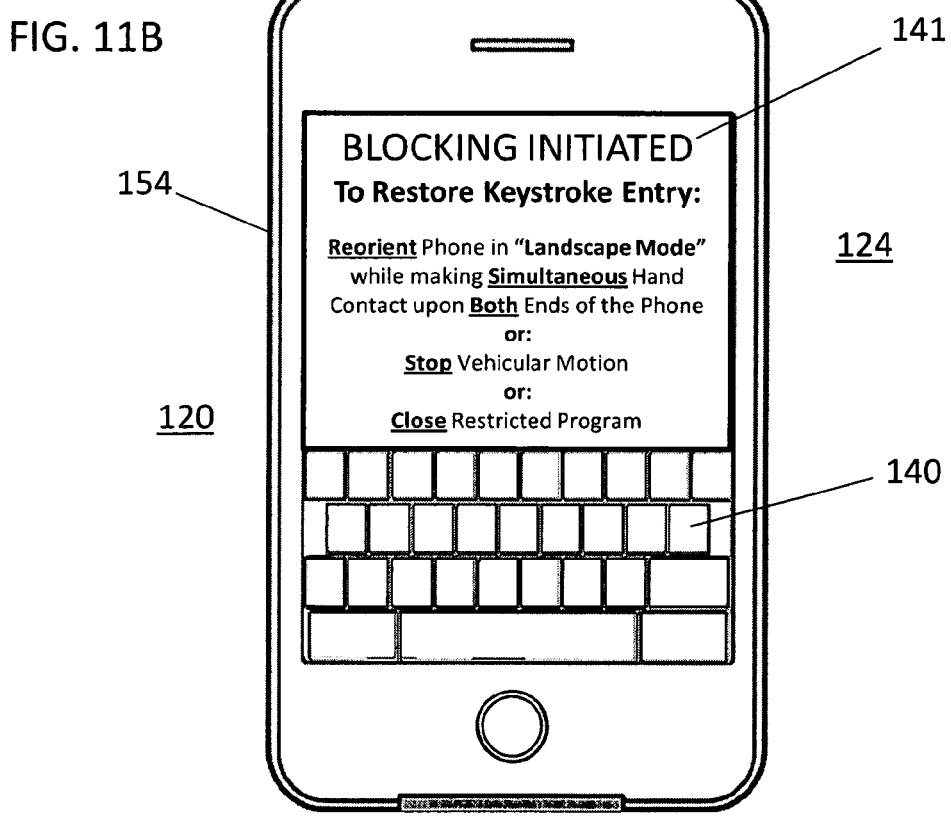

12B notifies the user of an active blocking action and displays the same blank "empty" alphanumeric keyboard previously illustrated in FIGS. 11A and 11B while defining the actions necessary for the user to restore the ability to enter keystrokes upon their phone.

Figure 12C:
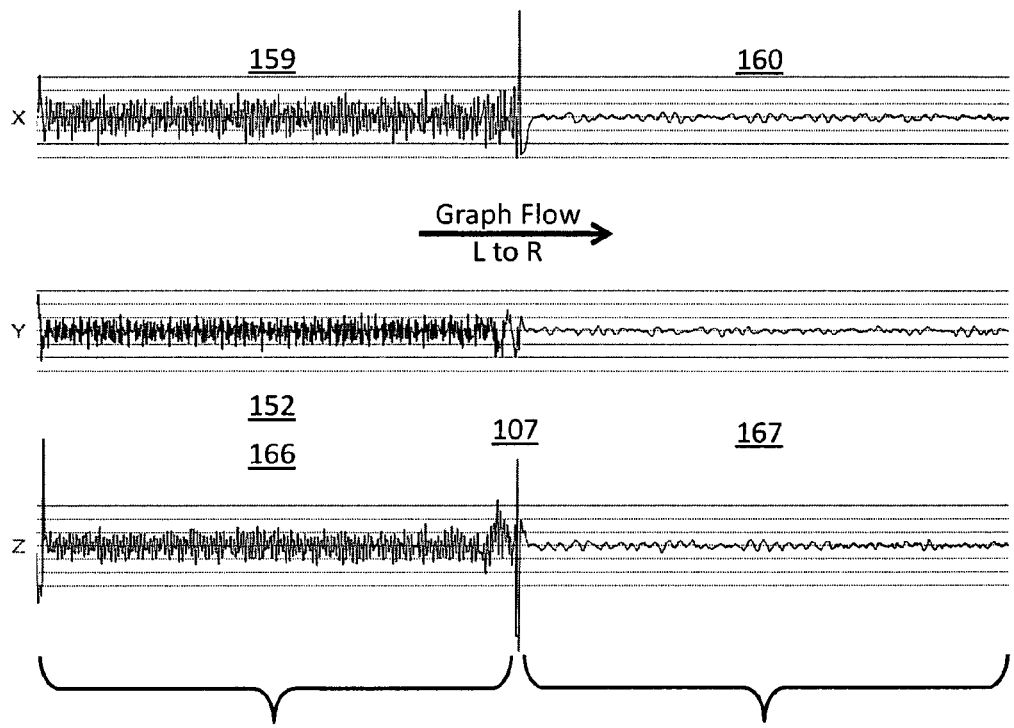

Looking at FIG. 12C, to illustrate the distinct vibratory signature that a phone would be able to pick up and analyze when a phone is being retained on the steering wheel, a real world plot is shown. This unaltered graphic evidence is taken from a phone being retained by a user first with the phone off the steering wheel, such as that of a passenger, and then directly placed upon the steering wheel as specifically depicted in 12A. Due to the left to right flow of the registry, the passenger motion is shown on the right half in a Passenger Plot 160 while the remaining half concerns the Driver Plot 159 as he sets the phone, while retained by his two hands, directly upon the steering wheel. The abrupt change in the motion pattern is dramatic. It is a relatively easy task to Differentiate 107 between the vibration waves and to predict them as being associated with either the driver or that of a passenger. The recordings from the X, Y, and Z axis are all consistent with a mild Baseline Wave 167 of Motion with rounded spaced peaks while being retained off the steering column as a passenger and then a heavy Rhythmic Vibration Wave 166 with sharp tight dense peaks was instantly transmitted when the phone was place in contact with the steering wheel. The differential in the signature from holding the phone directly in contact with the steering wheel or alternatively with the hands contacting the steering wheel while retaining the phone were non-consequential. In fact the signature remained evident even when the weight of the hands is slowly lifted upward off the steering wheel to the point that if you attempt to turn the wheel, there is not adequate frictional contact of the hand with the steering wheel to effect that turn. Even in that slightly uplifted position, a very discernible motion wave is reproduced that is easily identifiable when compared to that of the passenger's registry.

The distinct differential in the signature of a very strong and highly evident wave pattern is consistent in overall intensity whether the registry is taken while the engine of the vehicle is running with no vehicular motion or the registry is made inclusive of Rhythmic Vehicular/Roadway Vibrations 152. The difference in wave patterns between no motion and motion is mostly evident in the hill and valley relay of steering movement while still portraying a similar very dense tight signature pattern.

This one software improvement alone that is attuned for monitoring vehicular and roadway vibrations while looking for evidence of direct or indirect contact of the phone with the steering wheel will completely eliminate one of the most endangering and highly problematic texting and driving positions in use today, namely Two Hands on the Steering Wheel 143 texting. It has high application and value for both this invention as well as in support of other conventional or new systems that need to eliminate use of a phone on or in immediate proximity to the steering wheel or for other detection systems seeking solutions for vibration detection and related command and control systems in the execution of those solutions.

Returning to FIGS. 9 and 10, the simultaneous execution of both the grasping and the orientation requirements for the phone allows any phone users that are not the Driver 105 but are simply traveling within that particular vehicular platform as Passengers 106, to enter text as desired. It is thereby important to further define, expand, and emphasize that while keypad entry by the driver is prevented due to his inability to fulfill the concurrent orientation and grasping requirements upon the phone while the carrier vehicle is determined to be in motion, the other occupants of that vehicle or any persons that are simply traveling upon, within, but not steering a moving plane, boat, train, bus, etc., are allowed keystroke entry upon any "restricted" program as long as they satisfy the requirements for both of the user's hands to be simultaneously involved for grasp, orientation, and keystroke entry upon the phone. Those "non-driving" passengers likewise have full phone functionality for any "non-restricted" programs/features of their Wireless Device(s) 101 without regard to the presence of vehicular motion.

It should also be noted that persons having disabilities where a second hand is either not available or capable of executing keystrokes while fulfilling the required grasp across the contact areas of their landscape oriented phone, can have the required dual hand contact aspect of the restrictive technology disabled for their particular phone during the activation procedure at purchase. However, in order to provide a uniform degree of protection for the public from encountering other drivers committing the dangerous act of texting while driving, a person with any such handicap that limits their functionality to one hand would still have all of the remaining restrictive functions left intact for their phone. Importantly, this would include phone/vehicular linear travel motion along with the just described sensing method(s) for detecting the presence of any "alternating" phone motion that would parallel the rotational guidance of the steering wheel, or other orientation or vibration sensing, or other capabilities independent of the phone for determining direct phone contact or phone/hand contact with the steering wheel. The detection of such motion(s) of the phone would nullify any attempt to utilize the single functional hand of that user to hold his or her phone in simultaneous contact with the steering wheel in order to enter keystrokes while driving.

At this point, it should be elaborated upon that removal of the drivers' eyes from the constant survey of the approaching roadway for a period of 1 to 2 seconds is done by all drivers in order to view mirrors, adjust vehicular controls, or simply to enjoy passing scenery. However, beyond that point of 2 seconds belies a drastic turning point for maintaining a reasonable degree of safety in the operation of a vehicle in motion. Anything longer than 2 seconds of sight removal from the roadway correlates to a drastically escalating level of danger and the likelihood that the driver will cause a life endangering accident for himself, his passengers, the traveling public, or any pedestrian or other nearby innocents.

After reading the following paragraph, one only has to close his eyes for the short periods of time disclosed to mentally re-enact and visualize the horrible situations that might await the driver upon once again opening his eyes and attempting to react to the dynamics of the new visual driving scenario.

Blocking your vision for a 3 second period correlates with a deprivation of highway observance that is risky. A 3-4 second period is highly dangerous. A 5 second or more removal of driver observance from the roadway so degrades and incapacitates the capabilities of the driver to control and/or react to the changes in oncoming traffic that it is both idiotic and an activity that indulges in roulette with the lives of all concerned that are in close proximity to that distracted driver and his potentially lethal vehicle as it hurdles down that now endangered stretch of roadway.

Sight removal from a constantly changing and highly fluid driver environment cannot be entertained without being at the mercy of chance. One might get by for awhile but should the dangerous activity of prolonged eye removal from the roadway be continued for the superfluous and totally unnecessary purpose of viewing the screen or keyboard of a mobile device, it will often meet with highly unfavorable and potentially tragic consequences.

The present invention employs and follows several simple key sequential steps to prevent the driver of a moving vehicle from having the capability to enter SMS (Short Message Service) texting keystrokes upon a wireless device that is protected by the "phone stationed" sensing and restrictive architecture described in the preceding and following referenced embodiments, drawings, and claims of this specification.

Returning to View FIG. 2, explanation for the logic flowchart and operational diagram is provided in the following that describes steps for the preferred embodiment of the blocking technology of this invention. Before continuing this explanation for the sequential "order" of the various stages and options that comprise the blocking activity, it should be noted and clarified and emphasized that opening of a "non-restricted" program does "not" initiate any blocking action and the phone operates in a totally normal "unrestricted" manner.

However, immediately following the elective action taken by the user to turn on the Wireless Device 101 and to access, initiate, and "open" a program(s) or a phone feature(s) having the restrictive encoding of this invention intact for "blocking keystroke entry while driving", and during the entire period of time that the restricted programs or features remain open, then the immediate subsequent steps and activities shall follow upon actuation and use of that particular restricted program or feature.

Step 1) Sensing of Phone/Vehicle Parallel Movement—

Sensing and computation actions are instantaneously launched to determine any movement of the vehicular platform that currently carries or contains the Cellular Phone(s) 102 or other wireless communications devices that are preprogrammed and suitably equipped with the proposed blocking technology of this invention. This technology is inclusive of "on board" MEMS (Micro-Electro-Mechanical-Systems). The MEM may be a standalone accelerometer or employ some multi-axis combination of an accelerometer(s) and/or a gyroscopic sensor(s), and/or a magnetometer, and/or any hybrid array thereof, and/or other types of location, vibration, and/or movement in relation to the earth, compass and/or sensing systems. The MEM devices calculations of motion, orientation, and positioning may be interfaced with the computers' CPU or other logic chips employing customized detection/blocking algorithms to control overall programming and function. Their use may also be coupled with or backed up by cellular tower triangulation and tracking or any of the international GNSS (Global Navigation Satellite System) technological systems that pinpoint constant updates in global location as does our own American version of GPS (Global Positioning System) system. However, the advantage that an "on board" accelerometer calculation has over GPS or any other position surveying method for determining motion is its consistent reliability of service. On board sensors such as accelerometers do not depend upon over the air connections and inter-transmissions where poor reception between cellular towers due to physical obstacles, gaps in infrastructure coverage, mapping inadequacy, random dead spots, or insufficient satellite tasking can severely impede or cause momentary dropouts, or suffer from other transmission or lack of service issues. Other technologies such as INS (Inertial Navigation System), inclinometer, gravimeter, or any hybrid combination of any of the preceding physical location measurement, motion sensing, and/or other orientation formats such as compass, angulation, or other tilt detection systems, may also be employed. With the high frequency of observations being logged by these receiver/transmittal systems or any hybrid of the movement/orientation/location calculation device(s), a cooperative and reliable method of shunting the phone off and on for the respective denial or acceptance of phone text entry in parallel with the occurrence and detection of vehicle/phone movement, steerage vibration and/or rotation, or any other transit platform/phone movement and/or linear travel for which tracking may be desired, can be accomplished.

Step 2) Disable Portrait and Tabletop Phone Orientations—

For the entire span of time during which the "restricted feature/program" of the phone has been activated and remains open while the concurrent detection of motion for the Vehicle 104 and/or the Wireless Device 101 has been confirmed, the option for viewing the display screen of a portrait or laptop oriented Cellular Phone 102 is not an option since an internal programming command for Portrait Mode Exclusion 124 and Tabletop Exclusion 125 constantly prevails. However it should be noted that there is allowance and exception made, described in forthcoming description, for the portrait mode to remain available during the reception of phone calls and during the entire length of time that the back and forth telephone conversation is conducted. This conditional use exception is made entirely in respect to conforming to the highly convenient and ingrained natural ear to mouth inclination universally preferred for comfortably orienting the phone while conducting a phone conversation.

Step 3) Mandate Landscape View—

The concurrence of the Exclusion of the Orientation Modes 124 and 125 with the just stated "span of time" operational conditions, requires replacement by the remaining phone orientation, the Mandated Landscape Orientation 126. This is the exclusive phone orientation used by the preferred embodiment of this invention for both viewing and physically executing the entry of text upon the virtual display screen of the phone while the vehicle and phone are in simultaneous motion within a specified nominal range of speed. The allowance for text entry is only satisfied through adherence to the following condition(s) while maintaining the landscape orientation for the phone.

Step 4) Mandate Grasp Across Dual Contact Areas Upon the Phone—

Additionally, in order to enable the entry of Keystrokes 173 upon a wireless device being held in landscape orientation while the vehicle is moving, the users of all phones equipped per the present invention that are mutually traveling within that moving vehicle will have to employ a grasp of the hand(s) upon the exterior casing of the phone while engaging at least two specific mandated Contact Areas 135 designated upon that phone casing. These required phone contact areas are defined generally as being located near the middle upon each short end of the landscape oriented phone and/or may be continuous upon some portion(s) of the back/front faces of the phone casing. The contact areas generally employ tactile sensitive technology that is particularly receptive and indicative of contact/touch by some portion of the human body, in this case primarily the hands and fingers. These designated contact sensory areas have specific size and interspacing and possess the capability to detect capacitive "electrical charge/flow" changes, inductance differentials, and/or completed continuity between the sensory contacts. The contact areas pass those determinations on through phone circuitry interfacing with the computer's central processing and logic control chip(s) for execution and control of the desired disposition and application of the phone's restrictive programming. The dual contact areas would serve very well in validating and/or differentiating between the presence of one hand traversing both of the contacts or separate hands grasping a contact at each end of the phone concurrent with fulfilling the previous mandates for the phone being retained in landscape orientation while entering keystrokes.

Step 5) Monitoring Phone Axial Pivot or Vibration—

Additionally, while a restricted phone program is open and in use and while vehicular motion is sensed and the phone is grasped by the hand or hands while engaging the dedicated Contact Areas 135 concurrent with keystroke entry upon a Landscape 112 oriented phone, if any bi-directional rocking "back and forth" Axial Rotation 150 and changes in the compass setting of the phone is sensed in parallel to the axial turning and guidance of the Steering Wheel 123 then any future texting keystrokes will be immediately rejected. This blocking activity will continue until the offending "positive" detection is removed or otherwise rectified. In addition, sensing capabilities to detect a specified range and degree of Parallel Verticality 151 and/or any persistent rhythmic Vibrations 152 of the phone are also employed to indicate direct or semi-direct contact between the hands holding the phone and the steering wheel of a moving vehicle which would thereby also cancel keystroke entry. These particular motion, orientation, and vibration sensing applications would be well served by their own standalone accelerometer(s), or multiple-axis sensing accelerometer(s) in combination with a gyroscope and/or compass, or other hybrid sensing combination designed and tasked to combine and/or coordinate the vehicular motion sensing needs of Step 1, the phone orientation sensing needs of Step 2 and Step 3, and the axial rotative, degree of verticality, and vibratory sensing needs just described for this Step 5.

Step 6) Restriction Temporary Nullification—

It should be noted and understood that altering and/or the removal of the internal blocking instructions encoded for certain programs of the phone is not a choice entitled to be executable by the phone user. Other than implicit compliance with the preceding mandates for handling, orientation, and operation of the phone, the only user controllable actions to restore and enable keystroke entry are either to "close" and terminate use of the restricted program or elect to stop the vehicle and thereby cease corresponding phone based motion as well. Execution of either of those actions as further defined in the following will provide immediate and full removal of all blocking and restrictive programming.

Action 1—

Concurrent with the elective act for the abandonment and closure of any restricted phone program for which the encoded keystroke blocking instructions are intact, such as text messaging, upon any phone(s) that is similarly equipped with the restrictive technology and is located and traveling within the same vehicle, "that phone or phones" is immediately released and returned to full unabated usage for accessing its entire menu of phone features. Upon the subsequent opening of any "unrestricted" program(s) of the phone, keystroke entry is no longer blocked, sensing for steering wheel guidance and/or vibration is no longer tracked, portrait mode viewing is restored, and the specified requirements for involving both hands to simultaneously execute a grasp that touches contact areas upon the ends of a phone being retained in landscape orientation concurrent with executing keystrokes is no longer required thereby allowing single hand operation and entry of data upon the phone as desired.

Action 2—

While the phone feature encoded with the restrictive programming remains open, the detection of the vehicle being brought to a full stop or reaching a specified decreased rate of motion, the parallel deceleration of the phone(s) ensures that "all phones" within that vehicular platform that are similarly equipped with the restrictive technology are immediately released and returned to full unabated usage for accessing the full menu of features for that "open and in use" restricted program. Keystroke entry is no longer blocked, sensing for steering wheel guidance and/or vibration is no longer tracked, portrait mode viewing is restored, and the specified requirements for involving both hands to simultaneously execute a grasp that touches contact areas upon the ends of a phone being retained in landscape orientation concurrent with executing keystrokes is no longer required thereby allowing single hand operation and entry of data upon the phone as desired. The vehicle/phone "decreased speed" tracking and regulatory function for the automatic nullification and turn off of all restrictions for the phone is operational in parallel to the cyclical stopping and starting of vehicle motion during the entire period(s) of time that the program encoded with the restricted technology remains "open" and in use. However, the prevailing status of the program either being open or closed takes precedence and determines the respective initiation or termination of motion sensing. Should the phone user elect to cease use and close a particular program that is protected by the restricted data entry technology or to once again reopen it, then motion and/or all other sensing capabilities are simultaneously either terminated or initiated in parallel with respect to those particular program operative and/or actuation decisions made by the phone user.

Step 7) Difficulty for User to Circumvent Restrictions—

In parallel with the specialized equipping and programming of the phone and the choice to open and use any phone feature(s) having the encoded programming intact for the desired conditional use restriction(s) that control acceptance or denial of any finger swipe and/or entry of keystrokes, the operational control(s) for the turn on or turn off of those restrictions are primarily initiated by the on-the-fly detection of vehicular linear travel and/or parallel phone movement and/or other concurrent physical movements, contacts, orientations, or other dispositions of the phone and/or the phone user. Those operational control conditions and triggers are thereby a part of the internal hardware, the software programming code, and the physical design of the phone itself and are not easily overridden or circumvented by the phone user.

While considering between which format is more adaptable to upgrades in wireless device "restrictive use technology" in the alteration and/or equipping of either an expensive vehicle or a relatively inexpensive phone, it becomes obvious that changes or additions upon the phone itself are a more amendable medium. New adaptations or additions exclusive to the phone are much simpler, less expensive, and a more logical choice for inclusion of upgrades in the keystroke limiting technology versus the attempt to upgrade both the phone and the vehicle(s).

This fact is especially true in light of the constant stream of technological advances that make strides gained in wireless phone functions and performance an inevitable and frequent occurrence requiring most phones to be replaced every few years while cars tend to have a longer lifespan of use and ownership before seeking upgrades.

Other than 911 calls, the ability to place an outgoing call while on the move can be restricted or any and all of those phone activities that require periods of focus to read or enter a complex series of keystrokes or finger swipes, such as those needed to e-mail, tweet, browse, or input a GPS destination, can also be denied. Other features, such as receiving turn by turn directions or listening to MP3 player, might be realized as beneficial to driver welfare and thereby left unrestricted and available to the driver due to their being audio oriented and useful to the driver as aids to navigation or relaxment.

It was earlier stated that the portrait mode of the phone would be blocked and rendered non-operative during all programs encoded with the restrictive programming. That fact is accurate with the following conditional use exception(s).

Still Viewing FIG. 2, and in particular viewing the right side of the logic flowchart, the handling of incoming (middle right) and outgoing (bottom right) phone calls upon the restricted phone can be conducted in a variety of ways and is directed through manufacturer strategic preprogramming and planning for the phone. A preferred strategy for handling phone calls for the passengers within the vehicle will be discussed first followed by a plan for phone call management for the driver of the vehicle.

During the period that a restricted program upon the phone is open and in use, an incoming phone call ringing on the landscape oriented phone of a "passenger" traveling within a moving vehicle will have two immediate and concurrent consequences. All previous grasp and orientation requirements are immediately suspended simultaneous with the phone's portrait orientation immediately being restored. The phone's now vertically oriented display will list the callers' name upon the virtual screen along with the common "slide" or "push" icons for executing a finger swipe or tap to either accept or decline the call.

If the call is accepted, the phone can be held with one hand in the familiar "ear to mouth" phone inclination commonly employed to hear and talk. Upon completing the conversation, the "end call" icon is available upon the portrait oriented screen to terminate the phone call.

The termination of the call immediately returns the user to the previous restricted program and the state of phone use for which he was involved previous to receiving the phone call. Portrait mode is again disabled along with the re-establishment of the blocking technology for that particular program that renews the "default" requirements for the user to maintain the "dual contact" phone grasp upon the landscape oriented phone in order to enter keystrokes upon the virtual display of a phone being carried within a vehicle that has been determined to be in motion.

Upon a passenger desiring to place an outgoing call while currently using a restricted program, the telephone "keypad" icon displayed upon the landscape oriented phone is depressed concurrent with the user's hands completing the mandated hand touch across the two contact areas upon the phone. The numeric virtual keypad is now displayed upon the wide side to side landscape oriented screen. While the hands remain mutually involved in making either a two handed grasp upon the ends of the landscape oriented phone or the single handed "hold and peck" technique, the telephone number is entered and the call is placed through depressing the "send" icon. Once the send call command is executed, this instantly brings about the same two immediate and concurrent consequences just described for an incoming call. All previous grasp and orientation requirements are immediately suspended simultaneous with the phone's portrait orientation immediately being restored.

One hand can now be employed to hold the phone in the familiar "ear to mouth" inclination commonly employed by the phone user to hear and talk. The phone user listens for the other party to answer and proceeds with the conversation. Upon the desire to conclude the conversation or should the outgoing call never be answered, the "end call" icon is available upon the portrait oriented screen to terminate the phone call.

This again immediately restores the phone's display back to landscape mode due to the portrait mode again being disabled and returns the user to the previous restricted program and state of phone use for which he was involved previous to placing the phone call. The restricted "default" requirements are once again renewed and in force for maintaining a hand grasp upon the phone where dual contact is required to be made upon the two ends of the landscape oriented phone in order to enable the entry of any future keystrokes.

This describes the procedure for allowing any passenger(s) traveling within the moving vehicle to receive or place phone calls without hardship or complication from a phone that is programmed and equipped with the blocking technology per this invention.

Still Looking at FIG. 2, while continuing to view the right side of the logic flowchart, we now switch our description to the management of the phone call privileges for the "driver of a moving vehicle" per the restrictive technology of this invention.

As earlier stated, it can be elected to program the phone to either deny or allow the reception or placement of phone calls by the driver per the desires and logic expressed by the manufacturer or through publicly debated standards set to adequately protect the traveling public upon our roadways. However, in the following description it will first be discussed how the acceptance of an incoming phone call by the driver may be conducted. This course of preplanned phone programming whereby the driver can receive phone calls is often attractive if it should be determined to be in the best interest of the drivers' personal welfare and security or should it be desired by the parents and/or any other party concerned about staying in touch with that driver.

The driver is enabled to accept an incoming phone call upon the "landscape oriented" restricted phone per the same manner just described for a passenger. Upon the phone ringing indicating an incoming call, the portrait mode is immediately enabled allowing the driver to utilize a single hand to grasp the phone, thumb swipe the "accept" icon, and angle the phone between the ear and mouth in order to carry out the conversation. Upon termination of the call, the phone's display is immediately restored back to landscape mode and returns the user to the previous restricted program and state of phone use for which he was involved previous to receiving the phone call. The restricted "default" requirements are once again renewed and in force for maintaining a hand grasp upon the phone where hand contact is required upon the two ends of the landscape oriented phone in order to enable the concurrent entry of any keystrokes.

Placement of a phone call by the driver is an entirely different matter since it involves the re-focus of the mind and sight of the driver upon the virtual keyboard of the phone that importantly entails prolonged removal of the driver's eyes away from observing the roadway in order to effectively enter a multi-digit phone number.

It is thereby with full intent to prioritize public safety and welfare as well as to comply and adhere to the design intent of the preferred embodiment for preventing detailed keystroke entry upon a phone while driving, to leave all phone restrictive techniques in place and to prevent any entry of outgoing phone numbers by the driver. In doing so the driving public is protected from encountering a distracted driver.

Similar to the example just described for allowing the driver to receive phone calls for reasons of safety, it is recognized that it is often desirable or necessary to allow placement of an outgoing call requesting emergency aid, such as dialing 911. These emergency numbers are programmed to be universally operative for all persons across all applications regardless of any pre-existing program restrictions.

Additionally, since the hand touch requirement for maintaining a grasp across the two contact areas of the phone is discontinued upon a phone call being entered and sent thereby permitting portrait mode use of the phone, a passenger can be of aid to the driver by dialing and passing the ringing phone to the driver for conducting a conversation.

The only other exception to allowing outgoing calls by the driver might be for numbers that can be autodialed from a favorites list where individual keystrokes are not required.

However, the best assurance of achieving roadway safety is the total denial of outgoing calls from the driver's phone until all of the applied restrictions of this invention are cancelled through the driver taking the only appropriate and truly safe action by stopping the vehicle in order to resume full unabated use of his or her wireless device.

With regard to the sending or receiving of text messages or other SMS while the vehicle is moving, a passenger may send as desired while conforming to the two handed involved grasp and orientation requirements. In order to receive a text, the passenger will be required to entry a multi-digit code or response so that he or she may differentiate themselves from the driver through his or her ability to execute the code or response while conforming to the mandated two-hand involved grasp and orientation requirements concurrent with keystroke entry.

The driver himself is excluded from sending and receiving SMS while the vehicle is in motion.

In order to restore all phones to full unrestricted functionality, the vehicle simply needs to be pulled to the side of the road and travel stopped in order to once again enable unfettered keystroke entry without any phone orientation or grasp requirements.

Figure 16A:
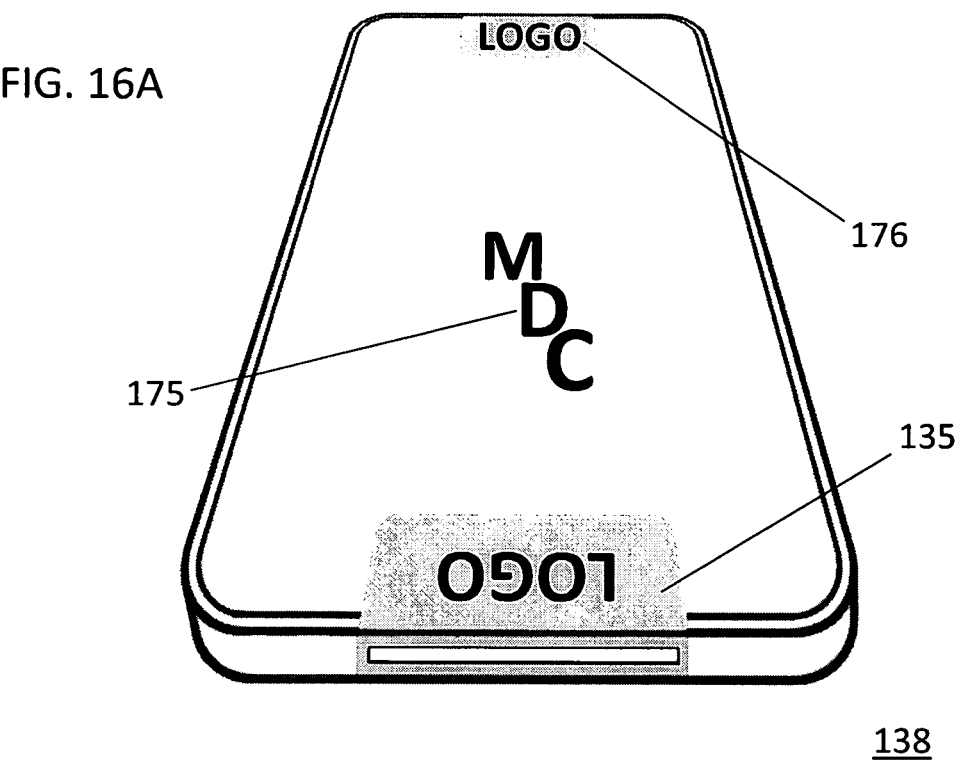
FIGS. 16A and 16B illustrate novel use of a phone manufacturer name and logo to be incorporated as some portion of the phone's integral mandated contact areas that are primarily situated upon the back, the two ends, and possibly some portion of the front of the phone.
Figure 16B:
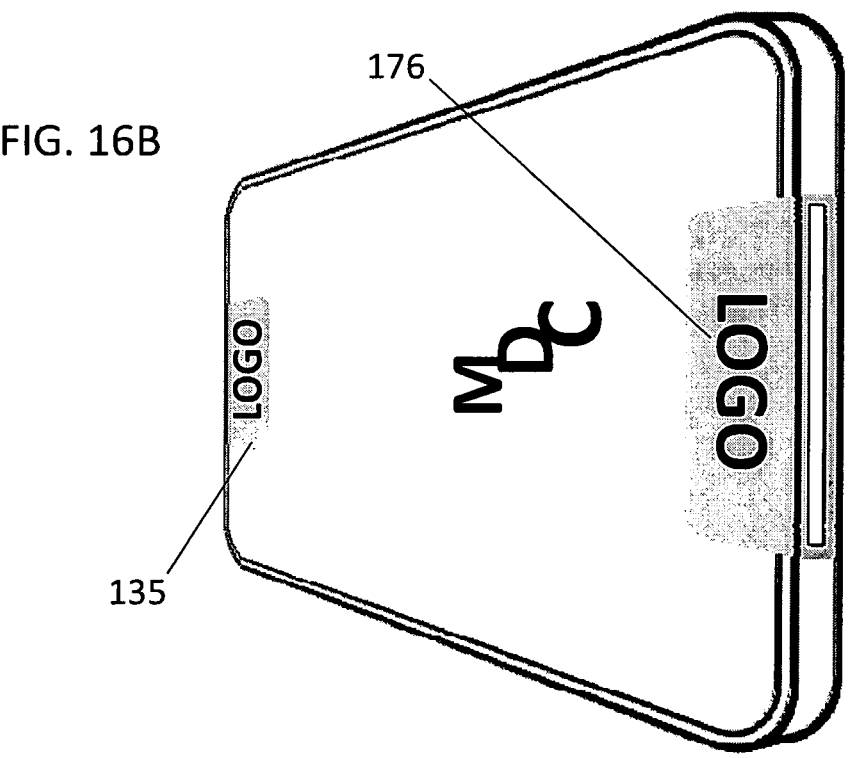

Viewing FIGS. 16A and 16B, illustration is made for the novel use of a phone Manufacturer's Name 175 and/or Logo 176 that can be incorporated as some portion of the phone's integral mandated contact areas that are primarily situated upon the back, the two ends, and possibly some portion of the front of the phone.

Figure 17A:
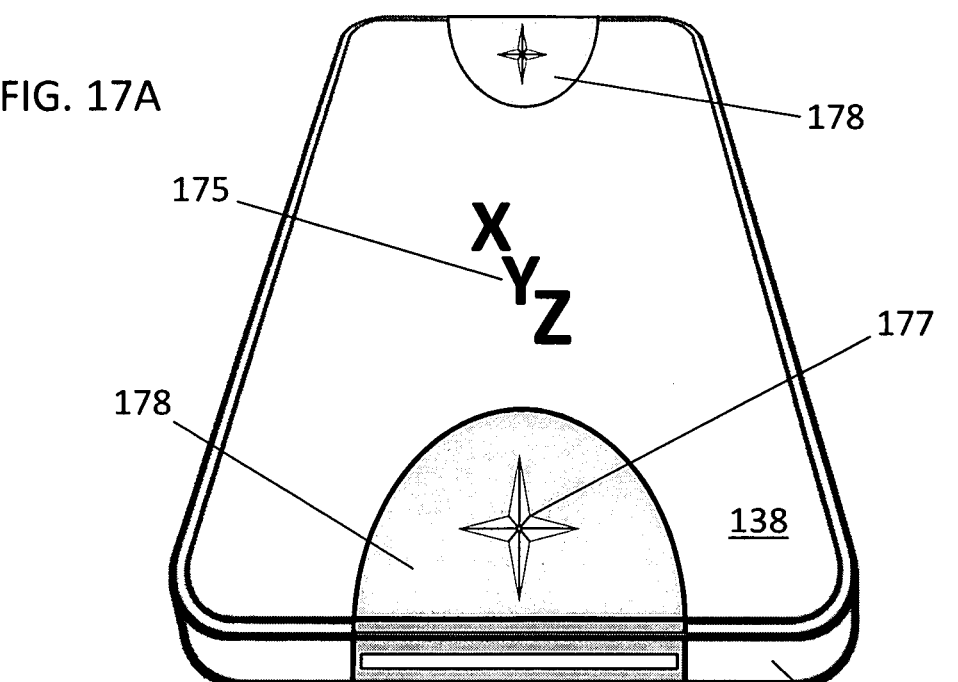
FIGS. 17A and 17B illustrate an alternate shaping for the contact areas. A generic manufacturer name along with further illustration of the placement of corresponding versions of fictional corporate insignias as 3-dimensional badges directly upon the alternate shape contact areas is made.
Figure 17B:
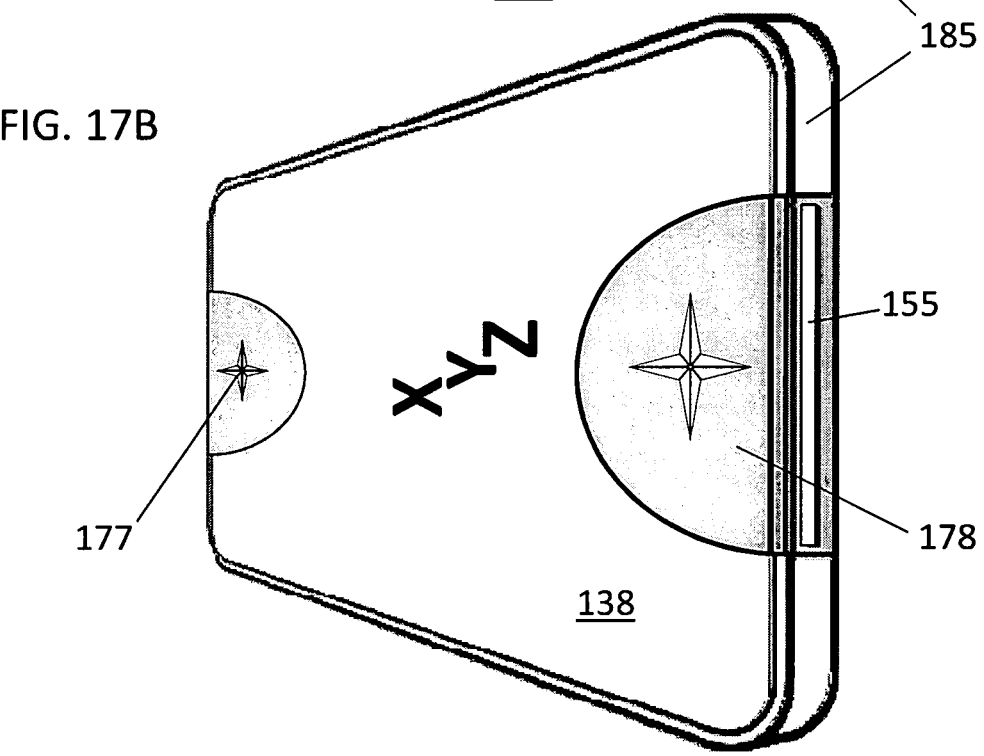

Viewing FIGS. 17A and 17B, depiction is made for Alternate Shape Contact Areas 178 integral to the phone.

A generic manufacturer name is shown along with further illustration of the placement of corresponding versions of fictional Corporate Insignia 177 directly upon the rounded version of the contact areas.

These corporate emblems might employ a 3-dimensional quality that interpret themselves as badges defining company ownership of a technology that signifies a corporate policy of taking direct action toward saving lives and improving public highway safety through reducing the highly problematic and endangering act of using a cellular phone to "text and drive".

It also is anticipated that fluidics technology could be employed in forming or removal of the 3-dimensional qualities of the emblems/badges and/or for producing a 3-dimensional form for the contact areas themselves.

The alternate shape for the contact areas employs semicircular areas of contact primarily situated upon both ends and the Backside 138 of Cellular Phone 102. The sharp corners for the contact areas illustrated in FIG. 19 are replaced with gently radiused corners that can be more easily manufactured.

The rounder facade of the contact areas still outlines adequate surface area enabling ease of access by the phone user in order to establish consistent hand contact upon the phone. As far as phone appearance, the front of the phone is altered very little while the phone ends and back fulfill a high level of quality and aesthetic appeal for the physical appearance of the contact areas that are integrally attached and incorporated within the surfaces of the phone in a manner that would continue to convey and signify excellence, quality, and eye appeal for the product line.

Viewing FIG. 18, in order to physically protect a user's investment in their "Smart Phone", while preserving the phone's integrity and uninterrupted availability, individuals often elect to purchase a secondary "retrofit" Protective Case Assembly 179 that is utilized for the direct encasement of their phones. The purpose of this protective housing is to shield against damage of the phone from impact, scratches, dirt/water infiltration, etc.

Looking at 18C, illustration is made for an embodiment of the phone of the present invention depicting the Backside 138 of Wireless Device 101 that includes integral Alternate Shape Contact Areas 178 upon both ends of Cellular Phone 102.

The alternate "semicircular" shaping for the hand contact areas of the phone are shown since it is deemed as a more amendable and durable master configuration for the manufacture and overlying fit of "sister" shaped cooperative cutouts integral to the components of the protective case. Radiused corners are preferred since they are easily manufactured and more resistive to fracture and/or tearing.

The following describes adaptations included upon the exampled Protective Case Assembly 179 that will provide adequate access for the establishment of the "mandated" physical connection between the hands of the phone user and either the semicircular Alternate Shape Contact Areas 178 or the previously exampled general rectangular shape for the Contact Areas 135.

Viewing 18B and 18D, construction of the protective casing of this invention will, in general, utilize multiple pieces and/or layers to assemble over the Cellular Phone 102 in order to provide a protective enclosure. In most instances, an Inner Case 180 is formed through the alignment of two or more constituent portions that facilitate ease of assembly around the housing of the phone and its exterior controls.

Figure 18A:
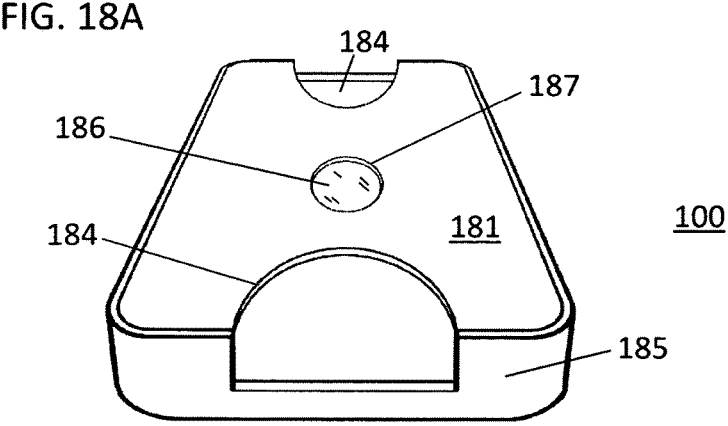
FIGS. 18A-D illustrate and encompass a cellular phone and a specialized encasement system that communicates and continues the restrictive qualities of the texting and driving denial system integral to the phone itself. The components comprising the Protective Case Assembly are depicted in 18A, 18B, and 18D. Upon these components being mutually and cooperatively positioned over a cellular phone that has alternate shaped contact areas as depicted in 18C, the phone will be enclosed and effectively protected within the housing provided by the protective case assembly. The components of the protective case assembly have provisions at both ends of their respective structure(s) in the form of hand access cutouts that mutually align to allow the hands of the phone user to directly access the underlying contact areas of the phone that is enclosed within the protective casing. The establishment of hand contact through these cutout areas and directly upon the contact areas integral to the enclosed phone, temporarily nullifies the blocking technology.
Figure 18C:
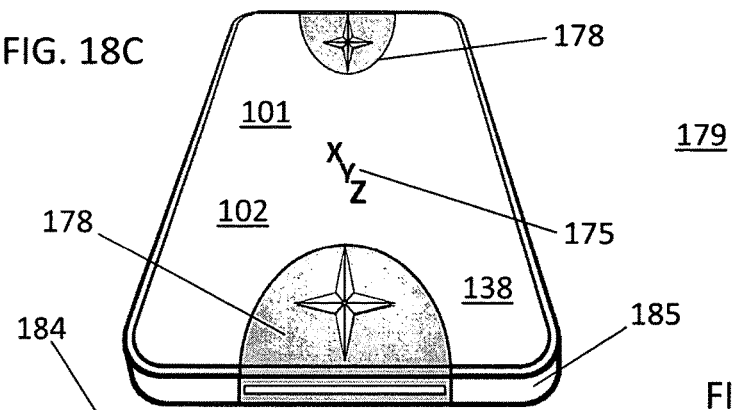
Figure 18B:
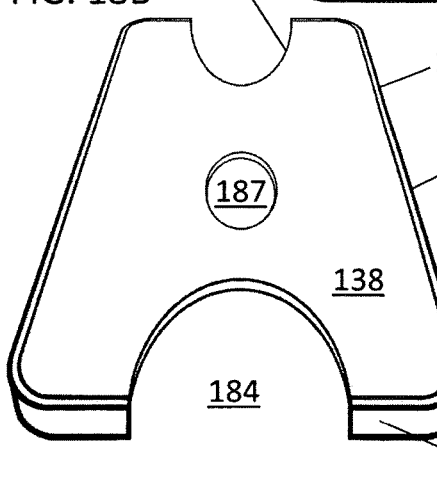
Figure 18D:
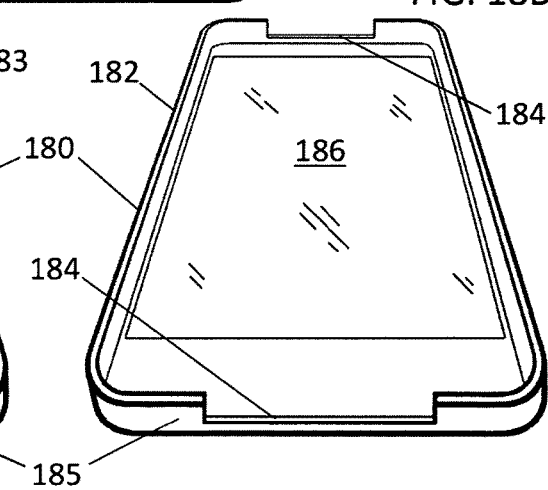

Viewing FIG. 18A, subsequent to the completion of that sub assembly that encloses the phone, the Inner Case 180 containing the Cellular Phone 102 is generally inserted, enclosed, and/or otherwise covered by an exterior, generally flexible, Outer Enclosure(s) 181 or skin that offers superior grasp, comfort, and aesthetics.

Together, these internal and outer structural components, or some variation thereof, cooperatively form Protective Case Assembly 179. The generally rigid internal case and the generally flexible outer enclosure mutually possess cooperative cutouts, openings, plugs, flaps or control buttons that enable access and operation respectively to and for the various external ports and controls of the encased Cellular Phone 102.

Returning to 18B and 18D, depiction is made for a Front Portion 182 of the Inner Case 180 that accepts and encloses the front face of a Cellular Phone 102 bearing a display screen that is employed by the phone user for observing and interacting with the graphic content of the virtual display. A "touch sensitive" Clear Panel 186 is included within Front Portion 182 that acts as a scratch resistant protective cover while providing unobstructed viewing of the underlying virtual display screen in tandem with facilitating the registry of any phone user relayed keystrokes or finger swipes.

Cooperatively located Hand Access Cut Outs 184 are provided upon the Front Portion 182 segment of Inner Case 180, that enable physical connection between the user's hands and the underlying Alternate Shape Contact Areas 178 situated at both ends of the phone. These cutout areas generally involve the End Surfaces 185, and possibly some part of the front face, of Front Portion 182 of Protective Case Assembly 179. The cutouts provide the user with superior access to establish hand contact with the Alternate Shape Contact Areas 178 integrally situated upon the End Surfaces 185 of Cellular Phone 102.

Viewing 18B and 18A, 18B shows the location of the Hand Access Cut Outs 184 that involve both the Backside 138 and the End Surfaces 185 of Back Portion 183 of Inner Case 180.

Similarly, 18A shows Access Cutouts 184 that are cooperatively situated upon both ends of the Outer Enclosure 181 that involve both its Backside 138 and its End Surfaces 185. The cutouts of the outer enclosure facilitate hand access through the underlying aligned cutouts of the inner case in order to reach and maintain mutual hand contact across the Backside 138 and/or End Surfaces 185 of Cellular Phone 102.

In addition, 18B shows a Viewing Portal 187 that provides a hole within Back Portion 183 of Inner Case 180 that aligns with an underlying Manufacturer's Name 175 located upon the Backside 138 of the cellular phone.

In 18A, Outer Enclosure 181 cooperatively includes an aligned Viewing Portal 187 that can be fitted with a Clear Panel 186. The clear panel seals the outer enclosure while permitting viewing of the underlying Manufacturer Name 175 upon the phone through the aligned viewing portal of the underlying inner case.

Looking at FIG. 19, alignment is illustrated for the assembly of the two portions of the inner case around the phone before their mutual insertion within the outer enclosure by Alignment Indicator Lines 188 that show the relative physical widths for the major structural components comprising Protective Case Assembly 179.

19B and 19D respectively show the Back Portion 183 of Inner Case 180 enclosing the Backside 138 of Cellular Phone 102 while the Front Portion 182 encloses the front face of the phone.

Inner Case 180 now carries Cellular Phone 102 within and is itself inserted within Outer Enclosure 181 thereby forming Protective Case Assembly 179.

Very importantly, upon completion of Protective Case Assembly 179, the Hand Access Cut Out 184 areas for all of its constituent components mutually align thereby providing an avenue of direct access for the hands of the user to establish and maintain physical engagement with the contact areas of the encased phone.

Figure 20A:
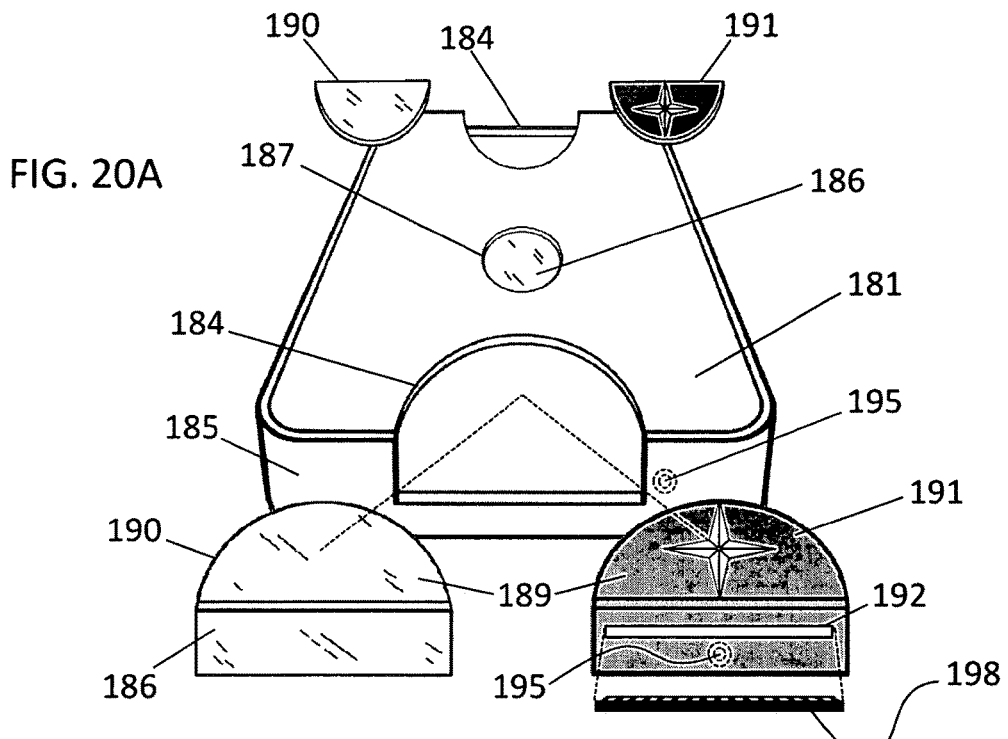
FIG. 20A depicts an alternate design for the outer enclosure where either a touch sensitive insert or a conductive insert can be integrally embedded within the outer covering, or alternatively the inner case, either during or following manufacture. These inserts are meant to transfer hand contact from the outer enclosure, or the inner case, to the underlying contact areas of the enclosed phone. 20B illustrates an alternate embodiment where the phone is sandwiched between front and back portions of an inner case while receiving a contact bar that bears integral contact areas on both of its ends. This subassembly is then finally received and encased within the outer enclosure depicted in 20A. The contacts on the ends of the contact bar replace and provide the same function as the just described inserts. Provision is made for an assembly bar with integral contacts that are meant to primarily serve in lieu of an existing phone without integral contacts in order to equip such a phone with the blocking technology of this invention. Interface options, inclusive of wireless interconnectivity, provide complete circuit continuity between the protective assembly and the enclosed phone and are shown in the form of various plugs, receptacles, adapters, and/or direct inter-contact between components.

Now Viewing FIG. 20, description is made for various Interface Options 189 between the components of Protective Case Assembly 179 and the underlying encased Cellular Phone 102. Examples are made for wired interconnections however it should be understood that wireless communicative options are the prevailing technology and would be ideally suited for connectivity between any outer housing components and the underlying cellular device.

20A shows a Clear Panel 186 that can be included as a secondary component in the form of a Touch Sensitive Insert 190 forming a contact area that relays hand contact by the phone user through the panel to the underlying contact areas of the phone. The Touch Sensitive Insert 190 is to be secondarily fitted within the Hand Access Cut Outs 184 of Outer Enclosure 181, or alternatively, the clear panel can be integrally embedded as a "Touch Sensitive" portion of the outer enclosure during the manufacturing process.

An alternative option to the touch sensitive insert is a Conductive Insert 191 that forms a contact area that is integrally embedded during manufacture or is post inserted within the Hand Access Cut Out 184 areas of Outer Enclosure 181. In one arrangement, the conductive insert contact areas of the outer enclosure directly engage and express electrical continuity with the underlying contact areas of the wireless device.

The Conductive Insert 191 contact area of the outer enclosure has a Docking Port Slot 192 that aligns with the underlying Charge/Docking Port 155 of the phone. Their mutual alignment still permits the insertion of an external connector for charging or docking of the phone. When the slot is vacant it may be protected by a fill plug or flexible flap or hinged insert.

Looking at 20B, an alternative interface embodiment depicted in 20B shows an Earphone Jack Access Hole 194 that generally has portions of the hole located upon both the Front 182 and Back 183 Portions that together form Inner Case 180. Upon their assembly around the phone, the access hole is aligned with an Earphone Jack 193, or other interface port, upon the End Surface 185 of the underlying Cellular Phone 102.

As depicted in 20A, an inward facing Miniature Pin 195 is integrally embedded within Outer Enclosure 181 and has circuit continuity with mutually embedded circuitry within the structure of the outer enclosure. The Conductive Insert 191 is also integrally embedded within Outer Enclosure 181 where it has in common circuit continuity with the same mutually embedded circuitry within the structure of the outer enclosure. It is through this common interconnection with the embedded circuitry within the outer enclosure that the embedded Conductive Insert 191 has circuit continuity with the embedded Miniature Pin 195.

As the inner case components are positioned around the phone a subassembly is formed as depicted in 20B. The subassembly itself is inserted as a unit within Outer Enclosure 181 from an end opposite to the inward facing plug. The Earphone Jack 193 of the phone envelops the inward facing Miniature Pin 195 of the outer enclosure thereby completing the circuit between the Conductive Insert 191 contact areas of the outer enclosure with the Alternate Shape Contact Areas 178 of the encased phone.

Returning to 20A, another interface embodiment that is an alternative to making direct contact between the contact areas of the phone with the overlying contacts of the Protective Case Assembly 179 provides a secondary Interface Plug 198. When the plug, that is integrally aligned with electrical contacts, is inserted within Docking Port Slot 192, the plug assumes the dual function of keeping debris from accumulating within the Charge/Docking Port 155 of the phone while uniquely making and relaying electrical connection between the circuitry of the phone with the Docking Port Slot 192 integrally situated upon the Conductive Insert 191 contact area of Outer Enclosure 181.

Still viewing 20A, on the end of the Protective Case Assembly 179 opposite to the Charge/Docking Port 155 of the encased phone, another embodiment provides an interior facing Miniature Pin 195 located on the Conductive Insert 191. This pin may similarly establish electrical connection within an Earphone Jack 193 or other port that is positioned within the Alternate Shape Contact Area 178 upon the end surface of the phone as depicted in 20B.

Figure 20B:
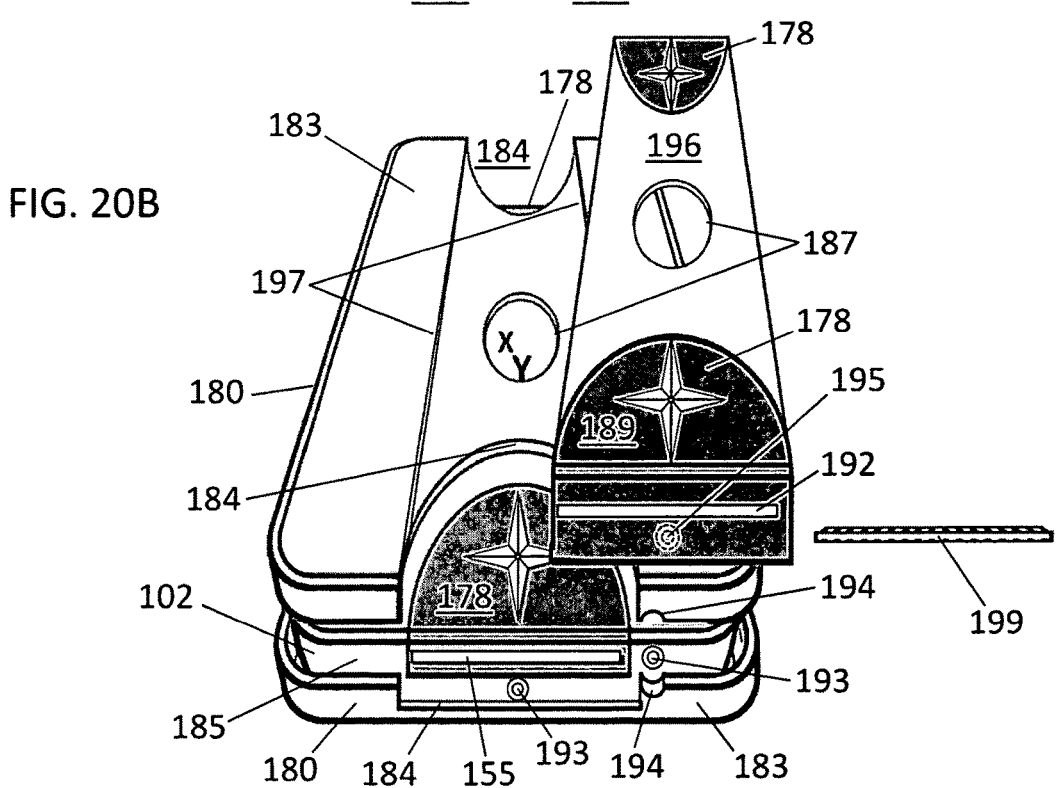

It should be noted for sake of clarity that the referenced drawings illustrated in FIG. 20B depict a couple of beneficial interface positions for the location of Earphone Jack 193 upon the End Surface 185 of Cellular Phone 102. However, it is requested to be understood that only one of these locations would normally be utilized in conjunction with the method chosen for interfacing the contact areas of the protective case assembly with the contacts and/or circuitry of the underlying phone. It should also be understood that the depictions show the earphone jack as being located adjacent to the charge/docking port upon the same end of the components for reasons of convenient illustration. Those two ports are normally disposed at opposing ends of the phone and thereby would generally interface with their cooperative plugs at opposite ends of the respective components comprising the protective case assembly.

The miniature inward facing pin may be embedded within a flexible or Hinged Flaps integral to Outer Enclosure 181 that would establish a mating interface within the Earphone Jack 193 or other socket or receptacle generally situated upon the End Surfaces 185 of Cellular Phone 102. The hinged flap itself would be constructed or overlain with a conductive material(s) that would perform satisfactorily as the contact areas. The miniature plug integral to the flap would engage its designated electrical receiving socket upon the end of the phone as the flap is closed or fitted within the Hand Access Cut Outs 184 of Outer Enclosure 181. Upon establishment of the continuity of that circuitry between the outer enclosure and the cellular phone, the conductive flaps would thereby assume the duty and function of the contact areas of the phone in verifying the maintenance of hand contact across the two ends of the outer enclosure similar to Contact Areas 135 previously described in the preferred embodiment.

If an outer enclosure is not used as an element or component of the Protective Case Assembly 179, then either the "touch sensitive" inserts or the electrically conductive inserts may be alternatively embedded or attached to the Hand Access Cut Outs 184 of the Back Portion 183 of Inner Case 180.

Specifically Viewing FIG. 20B, a longitudinal Recess 197 is provided upon the Backside 138 surface of Back Portion 183. This recess receives and carries a Contact Bar 196 equipped with an Alternate Shape Contact Area 178 at either of its ends. The contact bar may have embedded circuitry and is designed to be inserted over and generally flush with the Backside 138 of Back Portion 183 of Inner Case 180 that contains Cellular Phone 102.

This subassembly is then finally received and encased within the outer enclosure depicted in 20A. The contacts on the ends of the contact bar are meant to serve in lieu of a phone without integral contacts. The open cutouts of the outer enclosure permit the phone user with direct hand access to the underlying contacts of the contact bar. The cutouts of the outer enclosure could alternatively be filled with one of the inserts previously described.

Circuit continuity between the bar and phone are provided either by direct contact between the structures or a plug(s) can be provided such as Miniature Pins 195. The pins interface on either end of the phone within commonly used end mounted ports such as Earphone Jacks 193.

Alternatively, a contact bar constructed with flexible integrity would allow the bar to temporarily deform to enable the Miniature Pins 195 integral to the bar to directly engage within external ports of the phone such as Earphone Jacks 193. The plugs may have provisions centrally located on their ends in the form of an internal port with electrical contacts that would permit insertion of plugs originally intended for that particular master port.

The contact bar can alternatively be used as a filler portion between the open cutouts of the outer enclosure and an underlying phone having contact areas upon its ends. Upon its insertion, the contact areas of the contact bar may either make direct physical connection with the underlying contact areas of the phone or electrical continuity is established through an inward facing Miniature Pin 195 or a Docking Port Slot 192 and a secondary Interface Plug 198 arrangement similar to previous description.

In still another interface arrangement, an Interface Adapter 199 is provided. Upon insertion of that interface adapter within the docking slot, the adapter establishes continuity of the circuitry between the contact areas integral with that docking slot and the underlying docking port of the phone. In addition to the adapter making that interfacing connection, it has a central receptacle provision that carries conductor contacts that allow insertion of charging/docking peripherals without need of removal of the adapter.

Final containment of the contact bar upon the inner case and against the contact areas of the underlying encased phone is maintained and preserved through insertion of the entire assembly within Outer Enclosure 181.

The preceding arrangements where the outer enclosure serves as the contact areas at either end of the encased phone would importantly provide a method for adding the desired contact areas and blocking technology to a phone not possessing them. The outer enclosure would interface with those inadequately equipped phones through the earphone jack, the charging/docking port, or other available interface junctions. Subsequent downloading of an application/programming would interface the contact areas situated upon the outer enclosure with the internal processor, logic board, and accelerometer thereby retrofitting those phones having no integral contact areas with the restricted technology of this invention. The programming would also provide instructions to initiate a blocking state if the attempt is made to unplug and remove the protective enclosure in order to circumvent the technology.

In preceding description, a short extension was mentioned for adapting the intended contact areas to existing phones without the technology. The difficulty in keeping the user from simply unplugging these extensions and neutralizing the blocking technology was also discussed.

The difference between those types of short retrofit extensions that add contact areas to phones not supplied as original equipment and the just described protective enclosures that plug into the underlying phone is that contact areas on the protective enclosures simply supplement the contact areas upon the phone itself. The protective enclosure transfers the points of usage from being directly upon the contact areas of the phone to being directly upon the contact areas and circuitry of the Outer Enclosure 181 that is currently plugged into the phone circuitry.

If the procedure is reversed and the contact areas located upon the outer enclosure are disconnected from the underlying phone, then phone use is blocked until qualifying hand contact is reestablished directly upon the phone itself. In other words the blocking technology is not circumvented and requirement for hand contact to be established across the contact areas has simply been transferred from the outer location back to the inner "root" location. The technology can't be bypassed by simply unplugging Outer Enclosure 181.

The short extensions that add contact areas to a phone without them could also be made non-circumventable by downloading programming that would block that phone, while the vehicle carrying the phone has been determined to be in motion, until the extensions are plugged in and qualifying hand contact is established across the new extensions on either end of the retrofitted phone.

The problem with the additive nature of the extensions is their adaptability to all phones and their relative cost that normally makes it more attractive to simply buy a new phone having the technology already in place.

However, the outer protective case is desired and sought by the phone user as a protective housing for the wireless device. The addition of an outer enclosure simply supplements the restrictive technology by transference of the contact areas and their engagement by the hands of the user to the outer enclosure itself.

It is requested to be recognized that the preceding methods suggested for either retrofitting an existing phone with the novel hand contact areas and programming central to this invention or to provide adequate user access to the hand contact areas in conjunction with the use of a protective enclosure/assembly, are not to be limited by numbers, locations, and/or the physical designs shown in the examples and are intended only as representative illustration for the premise.

It is additionally requested to be recognized that the reality of the current nature of the cellular phone marketplace where phones and phone features are continually advancing with innovative upgrades make the attempt to retrofit an existing wireless device less attractive and economically prudent.

It is thereby to be reiterated that the preferred embodiment and approach for this invention is to provide a wireless device having its physical features and programming prepared at manufacture and then offered to the consumer base. Likewise, the preferred embodiment of the corresponding protective phone enclosure similarly incorporates during manufacture the physical design and features needed to access, complement, and/or accept the restrictive technology for a phone of this invention.

All of the preceding phone touch, grasp, and handling positions and techniques for this invention are ergonomically correct and equally accessible for execution by both right and left handed phone users.

A scale will be established and set for a permissible range of speed for the vehicular/phone medium to travel within before the restrictive programming would be triggered and apply a blocking action against the phone. A minimum rate of allowable motion is specified so as not to initiate any restrictions upon the phone of a person taking a leisurely walk and attempting to send a text or place a call. The lower end of this defined range of rate of allowed phone motion is also necessary to differentiate and compensate for hand movements associated with holding the phone. Defining an upper limit for the restrictive range could be warranted where a speed in excess of a specified rate would "not" initiate blocking action upon any phones carried by a vehicle that travels at a high rate of speed, such as an airplane. If an upper speed range were not to be defined, then passengers upon an airplane would still be able to use their phones through execution of the same grasping and orientation techniques as previously described for other vehicles.

Also, programming could be included that would be triggered by the higher rate of speed of an airplane that would preclude sending or receiving a phone call while still allowing internet research, surfing, shopping or other phone non-verbal activities that would not involve any active conversing by the user that would disturb other nearby passengers. However, user maintenance of the mandated grasp across the contact areas to nullify the restrictive programming would still apply.

For more vigorous activities that include increased rates of speed, such as running, biking, or motorcycling, any attempts at texting should and would fall under the same distractive ramifications as driving a car and would be preempted by the proposed restrictive features for the wireless device of this invention.

The benefits derived from the technological integration of a MEM chip(s), CPU logic chip, computer programming, and some simple exterior physical design features and additions to a newly manufactured cellular phone platform that has the potential to save many lives, is truly a product of the $2^{1st}$ century technological world in which we all share, work, and live.

The accurate and timely interpretation of the myriad of variables required to safely navigate a vehicle upon today's busy highways takes precedence over everything else and merits unequivocal protection from the flippant attitude of some drivers to choose to participate in any such irresponsible behavior as that entailed by texting while driving. A distracting activity elected by the driver that requires actions that run totally counter to his moral obligation to display caution in the operation of his vehicle upon the roadways in a careful and prudent manner "at all times".

It is requested to be recognized that the preceding description of packaged and/or individual features and functions outlined for the wireless phone system of the subject invention are meant as description and illustration only and are not to be construed as limiting in scope, use, or intellectual protection sought for other designs, variations, or embodiments for cooperative and/or parallel applications of usage of the present invention.

Upon further consideration, many other advantages and utilizations of the applicant's invention will become apparent to those skilled in the art from the previous descriptions and the claims hereupon.

Such scope is limited only by the following appended claims as read in light of and connection with the preceding specification.

What is claimed is:

1. A wireless communications device having a screen with a portrait mode and a landscape mode with an ability to distinguish between a driver and a passenger comprising:
    (a) a communications device housing having a back portion and landscape end portions and wherein the screen is disposed on the front of the housing;
    (b) a proactive on board Micro-Electronic Mechanical (MEM) system having a plurality of motion detection devices disposed entirely within the communications device communicating with each other to detect motion above a predetermined rate;
    (c) a portrait mode disablement device coupled to the proactive on board Micro-Electronic Mechanical (MEM) system to immediately block and disable the portrait mode keypad or input device and mandate the landscape mode with a landscape mode keypad upon detection of the motion above the predetermined rate to provide a first restricted use or blocking state;
    (d) a continuous grasp and retention detection device that requires at least one finger of each hand on the landscape end portions and on the back portion of the communications device housing to enter data on the screen and permit or enable operation of the communication device in response to the first restricted use or blocking state when the proactive on board Micro-Electronic Mechanical device detects the motion above the predetermined rate; and (e) a vehicular and/or highway rhythmic vibration detection device coupled to the continuous grasp and retention device to detect vehicular and/or highway body undamped vibration and disable the input of data on the landscape mode keypad and display on the screen to provide a second restricted use or blocking state.

2. The wireless communications device of claim 1 further comprising a back up or supplemental GPS (Global Positioning System), and/or GNSS (Global Navigation Satellite System) positioning system to detect motion as determined by signal triangulation.

3. The wireless communications device of claim 1 wherein the back portion of the housing has two finger positions with each finger position adjacent to opposite ends of the screen in the landscape mode.

4. The wireless communications device of claim 3 wherein the two finger positions adjacent to opposite ends of the screen in the landscape mode requires a continuous at least one finger of each hand grasp to enter data on the screen.

5. The wireless communications device of claim 1 further comprising an active control device to verify the continuous grasp and retention of the at least one finger position of each hand along the back portion of the housing to enter data on the screen.

6. The wireless communications device of claim 2 further comprising a control device to immediately or within a short interval of time provide a blocking state or remove a blocking state.

7. The wireless communications device of claim 1 wherein one of the plurality of motion detection devices is a multi axis accelerometer to sense steering wheel vibration, vehicle induced vibrations or highway induced vibrations.

8. The wireless communications device of claim 7 wherein the multi axis accelerometer does not sense bodily damped vehicle induced vibrations or highway induced vibrations.

9. The wireless communications device of claim 1 further comprising a capacitance device or an inductance device for detecting a continuous grasp and retention of the at least one finger of each hand on the landscape end portions or the back portion of the communications device housing or the back portion and a portion of the ends of the housing to enter data.

10. The wireless communications device of claim 1 wherein the proactive on board MEM system includes the motion detection devices selected from a group of motion detection devices including a gyroscope, a compass, a global positioning system, an inclinometer, a multi axis accelerometer, a tilt sensor, or a hybrid array.

11. A restrictive technology data entry device to distinguish between a driver and a passenger and to prevent a driver from texting while driving comprising:

(a) a case or housing having a screen with a portrait display keypad and a landscape display keypad and a communications device disposed inside the case or housing;

(b) a motion sensor in the case or housing coupled to the communications device to disable the portrait display keypad and mandate the landscape mode with a landscape mode keypad at a predetermined rate of motion to provide a first restricted use or blocking state;

(c) a continuous grasp and retention device disposed on the case or housing to require a continuous grasp and retention by at least one finger of each hand to allow an input of data on the screen in the landscape mode and permit or enable operation of the communication device in response to the first restricted use or blocking state; and (d) a rhythmic vehicular or highway vibration detection device to disable the input of data on the landscape display on the screen upon detection of undamped vehicular or highway vibration to provide a second restrictive use or blocking state.

12. The restrictive technology data entry device of claim 11 further comprising a protective case having a cut out or a conductive strip disposed in communication with the continuous grasp and retention device.

13. The restrictive technology data entry device of claim 12 wherein the protective case has a conductive strip in communication with the continuous grasp and retention device inside the housing.

14. The restrictive technology data entry device of claim 11 wherein the continuous grasp and retention device is an inductance device or a capacitance device.

15. The restrictive technology data entry device of claim 11 further comprising an audio/visual device to provide displayed messages or a visual numerical countdown or audible beeping to indicate a blocking state.

16. The restrictive technology data entry device of claim 11 wherein said rhythmic vibration detection device is a multi axis accelerometer.

17. The restrictive technology data entry device of claim 11 further comprising a computer control device to immediately or within a short interval of time provide a blocking state or remove a blocking state.

18. The restrictive technology data entry device of claim 11 wherein audio oriented devices are not disabled from the portrait display keypad or the landscape display keypad.

19. A cellular telephone apparatus with a restrictive data entry device to distinguish between a driver and a passenger using the cellular telephone apparatus comprising:

(a) a cellular telephone case with a screen having a tabletop or portrait mode keypad and a landscape mode with a landscape mode keypad and a wireless communications device disposed inside the cellular telephone case;

(b) a proactive motion sensor disposed inside the cellular telephone case connected to the tabletop or portrait mode keypad to disable the tabletop or portrait mode keypad and mandate the landscape mode and the landscape mode keypad upon detecting a predetermined rate of motion to provide a first restricted use or disablement state;

(c) a continuous grasp and retention device disposed on a back or a back and side of the cellular telephone case adjacent to each end of the landscape mode keypad that requires a continuous grasp by at least one finger of each hand in order to permit or enable the input of data on the landscape mode keypad in response to the first restricted use or disablement state;

(d) a multi axis accelerometer to disable the input of data by the driver on the landscape mode keypad upon detection of undamped vehicular or highway rhythmic vibrational motion and (e) wherein a communication between the continuous grasp and retention device and the multi axis accelerometer or proactive motion sensor distinguishes between the driver and the passenger by comparing damped and undamped vehicular or highway vibration.

20. The cellular telephone apparatus of claim 19 wherein audio oriented device, emergency telephone numbers and pre programmed telephone numbers are not disabled in the tabletop or portrait mode or the landscape mode.

* * * * *